United States Patent
Pai et al.

(10) Patent No.: US 11,449,712 B2
(45) Date of Patent: Sep. 20, 2022

(54) ANOMALY DETECTION AND REPORTING FOR MACHINE LEARNING MODELS

(71) Applicant: ADOBE INC., San Jose, CA (US)

(72) Inventors: Deepak Pai, Santa Clara, CA (US); Vijay Srivastava, Cupertino, CA (US); Joshua Sweetkind-Singer, San Jose, CA (US); Shankar Venkitachalam, San Jose, CA (US)

(73) Assignee: Adobe Inc., San Jose, CA (US)

( * ) Notice: Subject to any disclaimer, the term of this patent is extended or adjusted under 35 U.S.C. 154(b) by 950 days.

(21) Appl. No.: 16/220,333

(22) Filed: Dec. 14, 2018

(65) Prior Publication Data

US 2020/0193234 A1    Jun. 18, 2020

(51) Int. Cl.
| | |
|---|---|
| *G06K 9/62* | (2022.01) |
| *G06F 16/904* | (2019.01) |
| *G06N 20/00* | (2019.01) |
| *G06N 5/00* | (2006.01) |

(52) U.S. Cl.
CPC ......... *G06K 9/6262* (2013.01); *G06F 16/904* (2019.01); *G06N 5/00* (2013.01); *G06N 20/00* (2019.01)

(58) Field of Classification Search
CPC .... G06K 9/6262; G06F 16/904; G06N 20/00; G06N 5/00
See application file for complete search history.

(56) References Cited

U.S. PATENT DOCUMENTS

| | | | | |
|---|---|---|---|---|
| 10,673,880 | B1 * | 6/2020 | Pratt | H04L 63/1433 |
| 10,825,318 | B1 * | 11/2020 | Williams | G08B 21/0469 |
| 2020/0019852 | A1 * | 1/2020 | Yoon | G06K 9/6284 |
| 2021/0311863 | A1 * | 10/2021 | Ikeda | G06N 3/0454 |

\* cited by examiner

*Primary Examiner* — Arvin Eskandarnia
(74) *Attorney, Agent, or Firm* — Shook, Hardy & Bacon L.L.P.

(57) ABSTRACT

In various embodiments of the present disclosure, output data generated by a deployed machine learning model may be received. An input data anomaly may be detected based at least in part on analyzing input data of the deployed machine learning model. An output data anomaly may further be detected based at least in part on analyzing the output data of the deployed machine learning model. A determination may be made that the input data anomaly contributed to the output data anomaly based at least in part on comparing the input data anomaly to the output data anomaly. A report may be generated that is indicative of the input data anomaly and the output data anomaly, and the report may be transmitted to a client device.

20 Claims, 12 Drawing Sheets

374

THE ENGAGEMENT INDEX SHOWS AN OUTPUT DATA ANOMALY FOR AUGUST 2018

- THE NUMBER OF VALID ROWS OF INPUT DATA FOR FEATURE A WAS 2.3X THE STANDARD DEVIATION IN AUGUST 2018 AS COMPARED TO THE PRIOR THREE YEARS. (~65% CONTRIBUTION)

- THE PERCENTAGE OF DUPLICATE ROWS OF INPUT DATA FOR FEATURE B FELL OUTSIDE OF THE INTERQUARTILE RANGE IN AUGUST 2018 AS COMPARED TO THE PRIOR THREE YEARS. (~25% CONTRIBUTION)

- THE NUMBER OF DUPLICATE ROWS OF INPUT DATA FOR FEATURE C WAS 1.4X THE STANDARD DEVIATION IN JULY 2018. IMPACTS ON OUTPUT DATA FOR FEATURE C MANIFEST ONE MONTH AFTER INPUT. (~10% CONTRIBUTION)

ANOMALY DETECTION AND REPORTING FOR MACHINE LEARNING MODELS

BACKGROUND

An increasing number of highly technical industries rely on machine learning systems in production environments to learn from, classify, respond to, and/or otherwise use vast amounts of incoming data. Despite the often critical role of machine learning systems in these production environments, systems and measures for actively monitoring these systems are often absent or lacking in effectiveness. As a result, when an issue with a machine learning system is realized, conventional systems are not able to identify a link between the issue and the underlying cause, resulting in the use of significant amounts of computer and energy resources (e.g., to retrain the model). While the issue is being resolved, the machine learning system may, for an extended period, be offline or continue to operate with the issue—thereby generating incorrect results.

In some machine learning systems, deployed machine learning models may be actively evaluated (e.g., at regular intervals) to monitor the performance of the models. For example, once the performance degrades, the machine learning systems may provide support for retraining the model automatically. In addition, some machine learning systems provide information about the existence of any anomalies in either input data or output data of a model. However, the identification of the potential existence of these anomalies is where the analysis stops, and conventional systems are not able to identify a causal link between the output anomalies and the underlying issue (e.g., in some instances, an input data anomaly). In some systems, a model is retrained each time an anomaly is detected, leading to unnecessary use of computing and energy resources. For example, when the machine learning models degradation in performance is from an input data quality issue, retraining the model does not fix the underlying problem, thereby creating a significant draw on computing and energy resources without providing any resolution of the underlying issue.

SUMMARY

Embodiments of the present disclosure relate to anomaly detection and reporting for machine learning models. Systems and methods are disclosed that provide users with identified input data anomalies and a causal link between the input data anomalies and output data anomalies and/or performance anomalies to identify and/or prevent degradation in performance of machine learning models.

In contrast to conventional systems, such as those described above, the present system identifies a causal link between input data anomalies and output data anomalies and/or performance anomalies, thereby significantly reducing computing, energy, and bandwidth resources as compared to existing techniques for remedying issues with machine learning models.

In some examples, inputs, outputs, and performance of a deployed machine learning model are actively monitored and analyzed over time. As a result of the analysis, anomalies with respect to the inputs, the outputs, and/or the performance (e.g., based at least in part on the outputs) may be detected. Once anomalies are detected, for example, in the input data and the output data, the system determines a degree of contribution of the input anomaly(ies) to the output anomaly(ies). For example, because degraded performance in a deployed machine learning model often arises due to either deterioration in input data quality or input data distributional shifts (e.g., model was trained using input data from 90% female population but input data of deployed model is only 30% female), when an output anomaly is detected, the system determines a degree of contribution of identified input data anomaly(ies) to the cause of an output data anomaly and/or a performance anomaly. Thus, the present system is able to identify the causal relationship between the input data anomaly(ies) and the output data anomaly(ies) and/or the performance anomaly(ies) while simultaneously reducing the computing, energy, and bandwidth requirements necessary to rectify issues with machine learning models.

Further, due to the active monitoring and reporting of the current system, performance issues with the machine learning model are identified proactively and earlier in the process, before the machine learning model has degraded beyond repair. As a result, a significant reduction in energy and computing resources (e.g., server processing, bandwidth, etc.) is realized because rather than retraining the machine learning model (a significant drain on energy resources and a common approach in existing systems), the cause of the input data anomaly can often be rectified without a need for retraining. In addition, due to the active monitoring and reporting, downtime of the model (e.g., for input data corrections) is reduced in addition to the amount of time that the model may be demonstrating degraded performance.

BRIEF DESCRIPTION OF THE DRAWINGS

The present systems and methods for anomaly detection and reporting for machine learning models is described in detail below with reference to the attached drawing figures, wherein:

FIG. 3D is another example screenshot from a graphical user interface (GUI) for displaying and reporting machine learning model performance in accordance with some embodiments of the present disclosure;

DETAILED DESCRIPTION

Figure 1A:
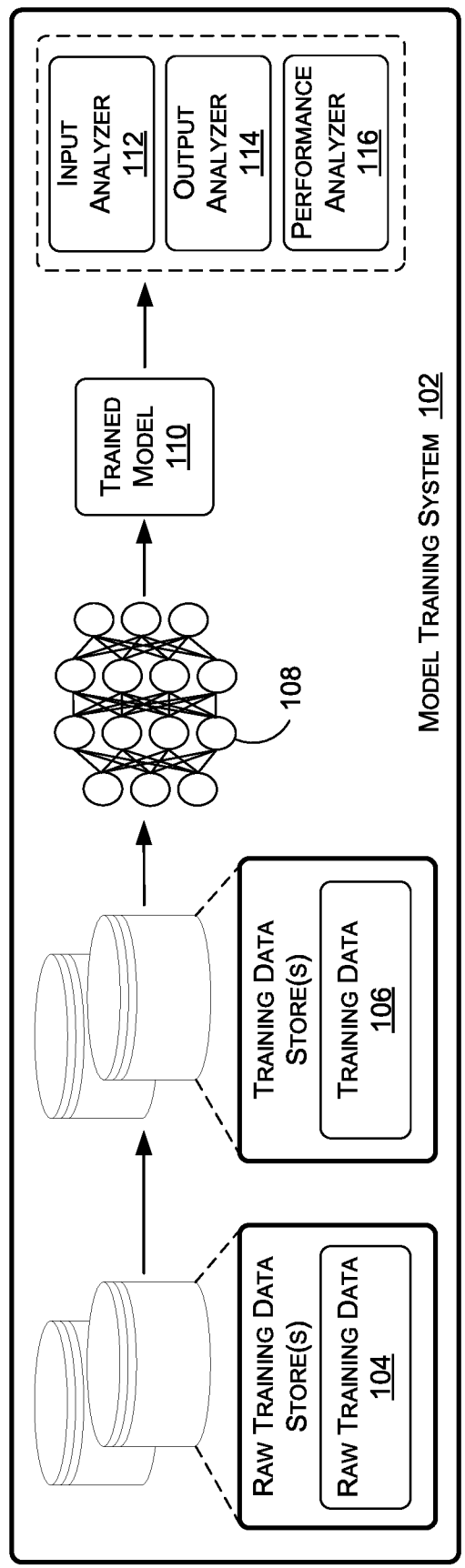
FIG. 1A is an example system diagram of a model training system in accordance with some embodiments of the present disclosure.

Machine learning systems are increasingly being used to deploy machine learning models into production environments to learn from, classify, respond to, and/or otherwise use vast amounts of incoming data. Despite the often critical role of machine learning systems in these production environments, systems and measures for actively monitoring these systems are often absent or lacking in effectiveness. As a result, conventional systems are not able to identify a link between an issue with a machine learning system and the underlying cause, thereby resulting in the use of significant amounts of computer and energy resources. Accordingly, while the issue is being resolved, the machine learning system may, for an extended period, be offline or continue to operate with the issue—thereby generating incorrect results.

For example, in conventional machine learning systems, when the underlying issue is an input data quality issue, the machine learning model is retrained each time a performance issue arises. However, retraining a machine learning model when the underlying issue is input data quality does not correct the performance issues of the machine learning model. As a result, a cycle of unnecessary consumption of computing and energy resources may result without a solution to the performance degradation being realized.

In some machine learning systems, deployed machine learning models may be actively evaluated to monitor the performance of the models. For example, once the performance degrades, the machine learning systems may provide support for retraining the model automatically. Even in machine learning systems that track performance, input data, or output data, the identification of a causal relationship between performance, input data, and/or output data is missing, thereby often leading to retraining machine learning models when unnecessary and at the cost of significant computing energy and resources. In addition, when the machine learning model degradation in performance is attributed to an input data quality issue, retraining the model does not fix the underlying input data quality issue, thereby creating a significant draw on computing and energy resources without providing any movement toward a resolution of the underlying issue.

Systems and methods are disclosed related to anomaly detection and reporting for machine learning models. For examples, in contrast to conventional systems, such as those described above, the present system identifies a causal link between input data anomalies and output data anomalies and/or performance anomalies, thereby significantly reducing computing, energy, and bandwidth resources as compared to existing systems used for remedying issues with machine learning models.

In some examples, inputs, outputs, and performance of a deployed machine learning model are actively monitored and analyzed over time. As a result of the analysis, anomalies with respect to the inputs, the outputs, and/or the performance may be detected. Once anomalies are detected, for example, in the input data, the output data, and/or the performance, the system determines a degree of contribution of the input anomaly(ies) to the output anomaly(ies) and/or the performance anomaly(ies). For example, because degraded performance in a deployed machine learning model often arises due to either deterioration in input data quality or input data distributional shifts, when an output anomaly is detected, the system determines a degree of contribution of identified input data anomaly(ies) to the cause of the output data anomaly. Because the system is identifying the causal relationship between the input data anomaly(ies) and the output data anomaly(ies), the amount of energy, computing, and bandwidth resources used to resolve the issues with machine learning models is drastically reduced as compared to conventional systems.

Further, due to the active monitoring and reporting of the current system, performance issues with the machine learning model are identified proactively and earlier in the process than previous approaches, before the machine learning model has degraded beyond repair. As a result, further reduction in energy and computing resources (e.g., server processing, bandwidth, etc.) is realized because rather than retraining the machine learning model, the cause of the input data anomaly can often be rectified without a need for retraining (e.g., by fixing and/or updating the data collection and/or preprocessing processes). In addition, downtime during resolution of the issues is also reduced, and the model is likely to be in-service producing useful results for a longer period of time.

In addition, in examples where the underlying issue is an input data distributional issue, further analysis may be performed to determine if the machine learning model should be retrained to account for the distributional shift. As a result, the machine learning model is only retrained when retraining has been identified by the system as the solution to the underlying issue that has caused the output anomaly(ies) and/or performance anomaly(ies), thereby further increasing the efficiency of the machine learning system.

Various terms are used throughout, some of which are described below:

An "anomaly" may refer to a deviation from a defined (e.g., user defined, predefined, etc.) standard or fixed value (e.g., a mean). For example, an anomaly may be determined when an input data metric, an output data metric, and/or a performance metric deviate a defined amount from a standard (e.g., standard deviation, range, inter-quartile range, etc.).

A "metric" may refer to a standard of measurement. For example, a metric, as used herein, may refer to a factor or statistic related to input data, output data, and/or performance of a machine learning model. Metrics may include a minimum, a maximum, a mean, a median, a variance, a calculated number (e.g., valid number of rows, number of rows, number of null values, etc.), a min, max, mean, median, or variance for a calculated number, area under the curve (e.g., when comparing predicted results of a machine learning model to the actual results), etc.

"Input data" may refer to the data input into a machine learning model (e.g., the input layer of a neural network). Input data may include raw input data (e.g., without pre-processing) and/or preprocessed data (e.g., data that has undergone an extract/transform/load (ETL) data pipeline).

"Output data" may refer to the data output by a machine learning model (e.g., the output layer of a neural network). The output data may be representative of the predictions (or learned behaviors) of the machine learning model.

"Performance" may refer to the accuracy of a machine learning model. The accuracy may be determined, in some examples, by comparing the outputs of the machine learning model to ground truth (or real-world) results. In such examples, a machine learning model that has acceptable or high performance may have an accuracy above a threshold accuracy (e.g., 80% accurate, 90% accurate, 95% accurate, etc.) while a machine learning model with accuracy below a threshold accuracy (e.g., 60% accurate, 70% accurate, etc.) may be considered unacceptable or of low performance.

"Granularity" may refer to a period of time corresponding to an instance of an input data metric, an output data metric, and/or a performance metric.

A "comparative period" may refer to a period of time over which an instance of an input data metric, an output data metric, and/or a performance metric may be compared to other instances of input data metrics, output data metrics, and/or performance metrics when determining whether anomalies exist.

A "distributional shift" may refer to a change in the distribution of an aspect associated with the input data. For example, if the input data used to train a machine learning model was generated from 90% of users that are between ages 18-27, then a distributional shift may be realized when the input data of the machine learning model during deployment is only 10% users that are between ages 18-27.

Embodiments of the present disclosure provide, at least in part, for detection of input data anomalies, output data anomalies, and performance anomalies (e.g., as a result of the input data anomalies and/or the output data anomalies) of a machine learning model(s). For example, the input data, the output data, and the performance of the machine learning model(s) may be tracked and analyzed over time (e.g., using input data metrics, output data metrics, and/or performance metrics). In some examples, the input data, the output data, and the performance may be tracked and analyzed during a training process for the machine learning model. Once the machine learning model is deployed, the input data, the output data, and the performance of the deployed machine learning model may also be tracked and analyzed.

The input data, the output data, and the performance of the deployed machine learning model at any given time may then be compared against the input data, the output data, and the performance of the machine learning model tracked and analyzed during training, as well as compared against any prior or subsequent input data, output data, and performance of the deployed machine learning model (e.g., prior to the given time). When an anomaly is detected in the input data, the output data, and/or the performance (e.g., as determined using any of a number of metrics, such as min, max, mean, variance, numbers of rows, numbers of valid rows, number of rows including erroneous data, such as nulls, histograms capturing distribution of values, area under the curve (AUC), Kullback-Leibler (KL) divergence, precision recall, classification error, etc., and a comparison of the metrics using standard deviation (SD), 2SD, range, inter-quartile-range (IQR), 1.5IQR, etc.), the causality (or contribution) of the input data anomaly(ies) to the output data anomaly(ies) and/or performance anomaly(ies) may be determined. In some examples, anomalous conditions may be defined by the machine learning system (e.g., predefined, standard, etc.), while in other examples, the anomalous conditions may be user-defined (e.g., one user might define anomalous conditions as any points lying outside the $98^{th}$ percentile, while another user may define anomalous conditions as any points lying outside the $95^{th}$ percentile).

Output data related metrics (and/or statistics) may be captured and stored (e.g., persistently, at intervals, etc.) based at least in part on output data of the machine learning model(s). The output data metrics may include any of a number of metrics, such as min, max, mean, or variance, for example. The metrics may be tracked to help in the determination of when output data of the machine learning model(s) is anomalous. For example, when one or more metrics for a particular subset of output data are determined to be outliers (e.g., fall outside of 2SD, fall outside of 1.5IQR, etc.), an output data anomaly may be detected.

Performance related metrics (and/or statistics) may be captured and stored (e.g., persistently, at intervals, etc.) based at least in part on a comparison of the output data to ground truth data (e.g., actual real-world data that the output data may be predictive of). The performance metrics may be calculated using AUC of the receiver operating characteristic (ROC) curve, precision recall, classification error, and/or other methods. For example, the output data may correspond to a predicted number of customers that will purchase a certain product in the next seven days. The ground truth data, in such an example, would be the actual number of customers that purchased the product over the seven days. In such an example, the performance of the machine learning model may be a comparison between the predicted number of customers and the actual number of customers as represented using the AUC of the ROC curve and/or another performance metric. This example may be representative of one instance of calculating a performance metric for the machine learning model, and the performance metrics (calculated persistently, at intervals, etc.) may then be compared against each other over time. A performance anomaly may be determined when a comparison of an instance of a performance metric falls outside of 2SD, falls outside the IQR, etc., with respect to the historical (e.g., prior and/or subsequent) calculations of the performance metric.

Input data metrics (and/or statistics) may be captured and stored (e.g., persistently, at intervals, etc.) that represent the input data quality and/or distribution. The input data metrics may include a number of rows, a number of rows containing provably erroneous data (e.g., nulls, unparsable data, etc.), histograms capturing distribution of values for input data types (or features), a number of duplicate rows, percentage of duplicate rows, etc. As an example, if a machine learning model were used to predict a percentage of users that will sign up for paid subscriptions on a given day, the machine learning model may have been trained using input data that included 500 rows of data per day. As such, if, when deployed, the input data only includes 100 rows of data per day, the machine learning model may not generate outputs and/or performance that lines up with the outputs and/or performance based on the input data the machine learning model was trained on. As a result, in such an example, the number of rows may used as a metric for determining an input data anomaly.

The input data metrics, in examples, may include an additional calculation based at least in part on the metrics, such as a mean, max, variance, or other calculation of the number of rows, the number of rows containing provably erroneous data, etc. In some examples (e.g., when determining input data distribution), an input data metric may include an output of a comparison of an instance of the input data (e.g., the input data for a given time frame, such as a day, hour, etc.) to historic input data (e.g., the last 30 days, 60 days, 90 days, etc.) calculated using KL divergence (and/or another method). In such an example, the anomalies may be detected based at least in part on the KL divergence values, such that when a KL divergence value for a particular instance of the input data is greater than 2SD, greater than 1.5IQR, etc., an input data anomaly is detected (e.g., for a particular input data type or feature).

A causal relationship (e.g., a degree or factor of contribution) between the input data anomaly(ies) and an output data anomaly and/or a performance anomaly can be determined. For example, when an output data anomaly and/or a performance anomaly is detected, the input data that corresponds to the output data related to the output data anomaly and/or performance anomaly may be analyzed (and/or input data anomalies detected from the input data that corresponds to the output data may be obtained). Once input data anomalies are determined (and/or detected) based at least in part on the input data that corresponds to the output data anomaly and/or performance anomaly, a causal relationship may be established between the input data anomaly(ies) and the output data anomaly and/or the performance anomaly.

In some examples, the input data associated with the input data anomaly may have been input into the machine learning model within a threshold time to the generation of the output data associated with the input data that caused the output data anomaly and/or performance anomaly. For example, if a machine learning model was used for predicting loan approval based at least in part on age and income, the input data (e.g., age and income) may generate output data in real-time or near real-time (e.g., within a threshold amount of time). In such an example, when there is an output data anomaly and/or performance anomaly detected, the input data that corresponds to the input data anomaly that contributed to the output data anomaly and/or performance anomaly may be determined to be the input data from within the threshold amount of time.

In some examples, the input data associated with the input data anomaly may have been input into the machine learning model prior to (e.g., outside of, or well outside of, the threshold time corresponding to real-time or near real-time) the generation of the output data associated with the input data that caused the output data anomaly and/or performance anomaly. For example, if the machine learning model is used for predicting conversions to paid subscriptions on a given day for currently free subscribers based at least in part on number of logins and amount of time using the service, at least some of the input data (e.g., the number of logins and the amount of time using the service) may generate output data at a time that is a day, a week, a month, etc. after the input data was collected and input into the machine learning model. In such examples, a determination is made as to which input data (e.g., input data from what time frame(s)) is associated with the output data that corresponds to the output data anomaly and/or the performance anomaly (e.g., the time lag between the input data and the output data may be determined). Once the time lag is determined, the input data anomaly(ies) associated with the input data from the determined time period may be used for determining a contribution to the output data anomaly and/or the performance anomaly.

In examples where more than one input data anomaly may have contributed to the output data anomaly and/or performance anomaly, a degree or factor of contribution may be calculated (and/or determined) for each of the input data anomalies. For example, when training the machine learning models, and/or by training a separate machine learning model that represents the machine learning model as a function of the input data quality, effects of the input data on the output data and/or the performance may be calculated (e.g., as represented by coefficients for each of the input data types or features). In such an example, the coefficients associated with each of the data types of the input data anomalies may be used when determining the degree of contribution to the output anomaly and/or the performance anomaly. In other words, input data anomalies caused by input data types (or features) with higher coefficients (e.g., input data types that have a greater effect on the output data) may be determined to have higher degrees (or factors) of contribution than other input data anomalies caused by input data types with lower coefficients (e.g., input data types that have less of an effect on the output data).

In some examples, the input data metrics associated with the input data anomalies may be used to determine the degree (or factor) of contribution to the output anomaly and/or the performance anomaly. For example, assume that first input data of a first input data type (or feature) is determined to be associated with a first input data anomaly because the first input data is four times the standard deviation (e.g., using absolute values). Also assume that second input data of a second input data type (or feature) is determined to be associated with a second input data anomaly because the second input data is three times the standard deviation. In such an example, the first input data anomaly may be determined to have a greater degree (or factor) of contribution to the output data anomaly and/or performance anomaly than the second input data anomaly. In other words, the contribution (or factor) of contribution of the input data anomalies may be calculated using the distance from a standard (e.g., the mean). Similar examples can be used for other metrics, such as the IQR, range, etc.

In some examples, a combination of two or more metrics may be used to determine the degree (or factor) of contribution. For example, an overall deviation score may be attributed to each input data anomaly that is an aggregate of two or more metrics, such as SD, IQR, range, etc. The degrees (or factors) of contribution may then be determined based at least in part on the overall deviation score (e.g., the higher the overall deviation score, the greater the degree of contribution). In addition, in some examples, a combination of one or more metrics and the coefficients associated with the input data types corresponding to the input data anomalies may be used to determine the degree (or factor) of contribution of the input data anomaly(ies) to the output data anomaly and/or the performance anomaly.

When one or more input data anomalies are determined to have contributed to an output data anomaly and/or performance anomaly, a report may be generated and transmitted to a client device. The report may be representative of the input data anomaly(ies) as well as the causal relationship (e.g., the contribution, degree (or factor) of contribution) between the input data anomaly(ies) and the output data anomaly and/or the performance anomaly. In some examples, based at least in part on the degrees of contribution for two or more input data anomalies, the report may include the input data anomalies listed from highest contributing (e.g., highest degree of contribution) to lowest contributing (e.g., lowest degree of contribution). The user may access the report via one or more graphical user interfaces (GUIs) within an application(s). By accessing the report, the user is able to determine what type of input data anomaly(ies) may have caused the output data anomaly and/or performance anomaly without manually searching for the causal link, thereby significantly reducing the consumption of computing, energy, and bandwidth resources as compared to traditional approaches.

When the output data anomaly and/or performance anomaly are determined to be caused by an input data anomaly, the input data anomaly can be corrected (e.g., without retraining the model), thereby reducing the amount of computing and energy resources needed while also maintaining a working machine learning model. In some examples, such as when the input data anomaly is indicative of an input data distributional shift (e.g., the machine learning model was trained with 75% of input data from people from Texas, while the input data for the deployed machine learning model includes only 5% of input data from people from Texas), the user is able to determine that retraining the model may be necessary, without first requiring manual effort and time (e.g., time that the machine learning model is not performing well and outputting useless results in a production environment) to diagnose the issue.

Ultimately, a causal relationship between input data anomalies and output data anomalies and/or performance anomalies can be determined while reducing computing and energy resources. In addition, issues with machine learning models deployed in production environments can be addressed proactively thereby increasing the efficacy of the machine learning models and increasing the usefulness of the machine learning models in the production environments. Further, because the machine learning models may only be determined to require retraining when actually necessary (e.g., not because of an input data anomaly that can't be remedied by retraining), significant resources (e.g., server processing, bandwidth, etc.) may be preserved.

Figure 1B:
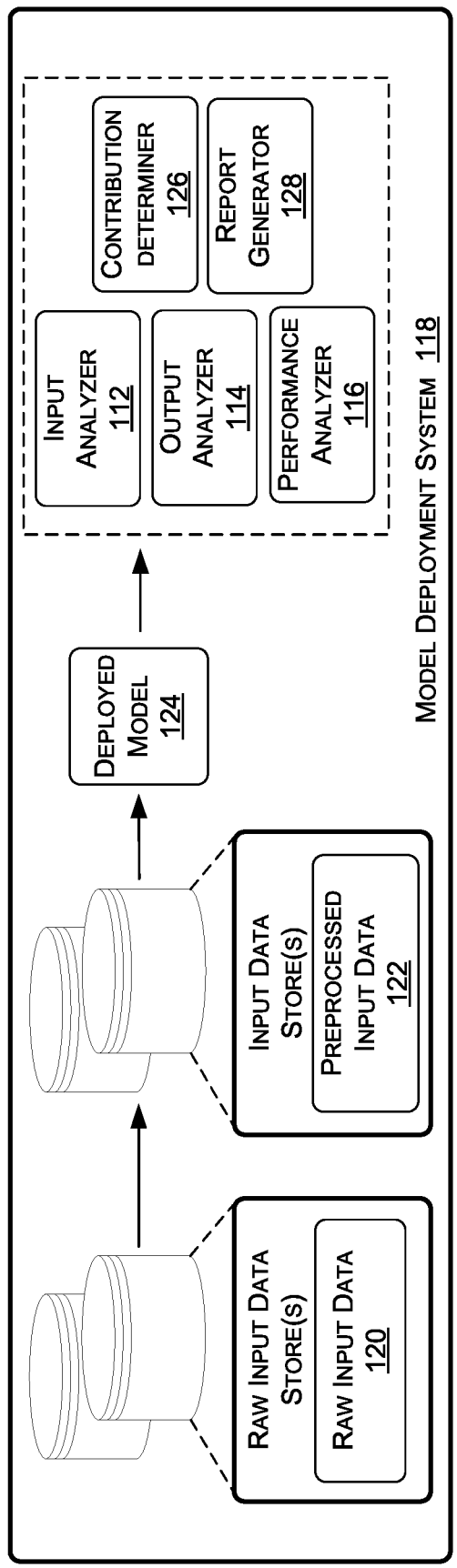
FIG. 1B is an example system diagram of a model deployment system in accordance with some embodiments of the present disclosure.

With reference to FIG. 1A and FIG. 1B, reference to input data may include raw training data 104, training data 106, raw input data 120, and/or preprocessed input data 122. Reference to output data may include data output by the trained model 110 (e.g., training output data 206 of FIG. 2A) and/or the deployed model 124 (e.g., output data 212 of FIG. 2B). Reference to performance may include the performance of the trained model 110 and/or the deployed model 124.

Referring now to FIG. 1A, a schematic depiction is provided illustrating an example model training system 102 in which some embodiments of the present disclosure may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The model training system 102 may include, among other things, a raw training data store(s) including raw training data 104, a training data store(s) including training data (e.g., after preprocessing the raw training data 104), a training component 108, a trained model 110, an input analyzer 112, an output analyzer 114, and/or a performance analyzer 116. The model training system 102 (and the components and/or features thereof) may be implemented using one or more computing devices, such as the computing device 600 of FIG. 6, described in more detail below.

The raw training data 104 may include any type of raw data that may be used by the training component 108 to generate the trained model 110. The raw training data 104 may be collected, generated, and/or obtained from any number of sources, such as files, databases, data stores, sensors, and/or other sources. In some examples, the raw training data 104 may be used directly by the training component 108 (e.g., without preprocessing), such as when the training component 108 is training a convolutional neural network. In such examples, the training data store(s) and the accompanying training data 106 may not be included in the model training system 102. In some examples, a combination of the raw training data 104 and the training data 106 may be used by the training component 108 to generate the trained model 110. In other examples, the training component 108 may only use the training data 106 for generating the trained model 110. In other words, the raw training data 104, the training data 106, or a combination thereof may be used by the training component 108 to generate the trained model 110.

The training data 106 may include the raw training data 104 after preprocessing. For example, data preprocessing may be performed by the model training system 102 to convert the raw training data 104 into a clean (e.g., usable) data set (e.g., the training data 106). For example, the raw training data 104 may be collected, generated, and/or obtained in a raw format, which may not be feasible, effective, or usable by the training component 108 for generating the trained model 110. In addition, the raw training data 104 may include inaccurate or missing data (e.g., as a result of gaps in data collection, mistakes in data entries, technical problems with sensors, such as biometric sensors, and the like), noisy data (e.g., erroneous data or outliers), and/or inconsistent data (e.g., duplication of data, human data entry errors, mistakes in codes, etc.).

During preprocessing, the raw training data 104 may undergo various processes, such as data cleaning, data integration, data transformation, data reduction, and/or the like. For example, when the raw training data 104 includes inaccurate or missing data, the missing data may be ignored (or deleted) when generating the training data 106 (in examples where the number of missing values is not too large), the missing data may be manually filled (in examples where the number of missing values is not too large to create an unreasonable task), and/or the missing values may be filled using computed values. For examples, to fill the missing values using computed values, the mean, mode, or median of the existing raw training data 104 could be used in place of the missing values. As another example, a machine learning model can be implemented to generate predictive values for the missing values of the raw training data 104.

When the raw training data 104 includes noisy data, the data preprocessing may include data binning, clustering, employing a machine learning model, and/or manual removal. For example, substantially continuous data from the raw training data 104 can be grouped together into a smaller number of "bins" (e.g., if the raw training data 104 includes every age from 0-100, the ages may be "binned"

into groups of ages at five year intervals). As another example, similar data may be grouped together (e.g., into the same cluster), and/or a machine learning model (such as a regression algorithm) may be used to smooth the raw training data 104. In some examples, the noisy data can be deleted manually.

In some examples, after preprocessing, the raw training data 104 (and/or the training data 106) may undergo data wrangling (or data munging). For example, the training component 108 may use data wrangling during the training process of generating the trained model 110. Data wrangling may be used to transform and/or map the raw training data 104 into a different format that is more appropriate and/or valuable for downstream purposes (e.g., analytics). For example, as the training component 108 is training the model (e.g., after one or more iterations), a different format for the one or more types of the raw training data 104 (and/or training data 106) may be determined to be more suitable for downstream purposes than the format that is currently being used. By reformatting the raw training data 104 (and/or the training data 106), analysis of the input data, output data, and/or performance of the trained model 110 (and/or the deployed model 124 of FIG. 1B) may be more effective.

The training component 108 may use the raw training data 104 and/or the training data 106 to generate the trained model 110. Although the training component 108 of FIG. 1A includes a general illustration of a neural network, this is not intended to be limiting. For example, the training component 108 may be used to train any type of machine learning model, such as machine learning models using linear regression, logistic regression, decision trees, support vector machine (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short terms memory, Hopfield, Boltzmann, deep belief, deconvolutional, generative adversarial, liquid state machine, etc.), and/or other types of machine learning models.

The trained model 110 may be generated by the training component 108 using the raw training data 104 and/or the training data 106. The trained model 110 may include one or more models, such A/B models that are tested. Once it is determined that the trained model 110 has acceptable accuracy, the trained model 110 may be deployed (e.g., as the deployed model 124). The determination that a trained model 110 has acceptable accuracy may include a threshold accuracy, such as, for example and without limitation, 80%, 90%, 98%, etc. The threshold accuracy may be predefined by the model training system 102, or may be user defined.

The trained model 110 may be analyzed during training, after training, and/or after deployment (e.g., as the deployed model 124 of FIG. 1B). The analysis may be performed by an input analyzer 112, an output analyzer 114, and/or a performance analyzer 116. Although various different input data metrics, output data metrics, and performance metrics are described herein with respect to the input data, the output data, and the performance, respectively, this is not intended to be limiting. For example, and without departing from the scope of the present disclosure, any of the input data metrics may be used for the output data metrics and/or the performance metrics, any of the output data metrics may be used for the input data metrics and/or the performance metrics, and/or any of the performance metrics may be used for the input data metrics and/or the output data metrics.

With respect to the model training system 102, the input analyzer 112 may analyze the raw training data 104 and/or the training data 106 that is input into the training component to generate the trained model 110. In other words, the input analyzer 112 may analyze the input data that is used by the training component 108 to generate the trained model 110. Any number of input data metrics may be determined based at least in part on the analysis of the input data by the input analyzer 112. For example, the number of rows of the raw training data 104 and/or the training data 106 may be calculated, the number of rows containing provably erroneous data (e.g., nulls, inaccurate data, values with the wrong type, such as a float instead of an integer, unparsable values, such as a text string that should be an address but is not, etc.) may be calculated, histograms capturing distributions of one or more of the data types (e.g., features) of the raw training data 104 and/or the training data 106 may be generated, KL divergence may be calculated to determine distributional shifts in the input data across different time frames and granularities, and/or any other input data metrics may be determined.

The input data metrics may be calculated persistently, at intervals, in response to user requests, and/or the like. The input data may be time stamped (e.g., in metadata) such that the input data metrics may be calculated over certain time periods. For example, if the input data metric were the number of rows of the input data containing provably erroneous data, this input data metric may be calculated and/or stored, without limitation, per minute, per hour, per day, per week, etc. A user may be able to define the time, the time periods may be predefined, default, and/or set by the model training system 102, or a combination thereof.

The input data metrics may be calculated and/or generated for time periods to enable the input analyzer 112 to compare the input data metrics at one time to the input data metrics at another time(s) in order to detect input data anomalies. For example, the input data metrics may be compared persistently, at intervals, as requested by a user, and/or at other times to the prior and/or subsequent input data metrics for the trained model (and/or the deployed model 124, as discussed with respect to FIG. 1B, below). As mentioned herein, the time period associated with an instance of an input data metric may be referred to as the granularity of the input data metric, and the period of time that the instance of the input data metric is compared to may be referred to herein as the comparative period. For example, if an instance of an input data metric were calculated each day, and the instance of the input data metric were compared to the other instances of the input data metrics from the previous 90 days, "each day" would be the granularity and the "previous 90 days" would be the comparative period.

To detect an input data anomaly, any of a number of methods may be used. For example, different multipliers of standard deviation (SD) (e.g., SD, 2SD, 3SD, etc.), range, or inter-quartile-range (IQR) (e.g., 1.5IQR, IQR, 2IQR, etc.) may be used to detect anomalies. In addition to SD, range, and/or IQR, other methods may be used to calculate and measure differences between the input data metrics over time for detecting input data anomalies.

As an example, if the method used for detecting input data anomalies is 2SD, the number of rows (or a calculation based at least in part on the number of rows, such as mean, max, variance, etc.) in the raw training data 104 and/or the training data 106 is the input data metric, and the input data metric is measured on a daily basis, an input data anomaly may be detected for a given day when the number of rows of the raw training data 104 and/or the training data 106 is greater than 2SD of the number of rows calculated for other days (e.g., some or all of the days prior to and/or subsequent to the given day).

As another example, if the method used for detecting input data anomalies is the SD, the KL divergence of the gender of the user associated with the input data is the input data metric, and the input data metric is measured on a weekly basis, an input data anomaly may be detected for a given week when the KL divergence is greater than the SD of the KL divergence for other weeks (e.g., some or all of the weeks prior to and/or subsequent to the given week).

Again with respect to the model training system 102, the output analyzer 114 may analyze the output data from the trained model 110 (and/or the deployed model 124 of FIG. 1B, as will be discussed in more detail below). In other words, the output analyzer 114 may analyze the output data that is output by the trained model 110 (and/or the deployed model 124). Any number of output data metrics may be determined based at least in part on the analysis of the output data by the output analyzer 11. For example, the standard range and distribution of the output data may be analyzed. More specifically, the output data metrics may include the minimum, the maximum, the mean, the variance, and/or other output data metrics (e.g., statistics).

The output data metrics may be calculated persistently, at intervals, in response to user requests, and/or the like. The output data may be time stamped (e.g., in metadata) such that the output data metrics may be calculated over certain time periods. For example, if the output data metric were the mean, the mean of the output data may be calculated and/or stored, without limitation, per minute, per hour, per day, per week, etc. A user may be able to define the time periods, the time periods may be predefined, default, and/or set by the model training system 102, or a combination thereof.

In any example, the output data metrics may be calculated and/or generated for time periods to enable the output analyzer 114 to compare the input data metrics at one time to the output data metrics at another time(s) in order to detect output data anomalies. For example, the output data metrics may be compared persistently, at intervals, as requested by a user, and/or at other times to the prior and/or subsequent output data metrics for the trained model 110 (and/or the deployed model 124, as discussed with respect to FIG. 1B below). As mentioned herein, the time period associated with an instance of an output data metric may be referred to as the granularity of the output data metric, and the period of time that the instance of the output data metric is compared to may be referred to herein as the comparative period. For example, if an instance of an output data metric were calculated each minute, and the instance of the output data metric were compared to the other instances of the output data metrics from the previous twenty-four hours, "each minute" would be the granularity and the "previous twenty-four hours" would be the comparative period.

To detect an output data anomaly, any of a number of methods may be used. For example, different multipliers of SD (e.g., SD, 2SD, 3SD, etc.), range, or IQR (e.g., 1.5IQR, IQR, 2IQR, etc.) may be used to detect anomalies. In addition to SD, range, and/or IQR, other methods may be used to calculate and measure differences between the output data metrics over time for detecting output data anomalies.

As an example, if the method used for detecting output data anomalies is 1.5IQR, the minimum is the output data metric, and the output data metric is measured on an hourly basis, an output data anomaly may be detected for a given hour when the minimum of the output data falls outside of 1.5IQR as compared to the minimum of the output data calculated for other hours (e.g., some or all of the hours prior to and/or subsequent to the given hour).

With respect to the model training system 102, the performance analyzer 116 may analyze the performance of the trained model 110 (and/or the deployed model 124 of FIG. 1B, as will be discussed in more detail below). In other words, the performance analyzer 116 may analyze the output data that is output by the trained model 110 (and/or the deployed model 124) in view of the ground truth (or actual) data to determine the performance of the trained model 110 (and/or the deployed model 124). Any number of performance data metrics may be determined based at least in part on the analysis of the output data in view of the ground truth data by the performance analyzer 116. For example, the area-under-the-curve (AUC) for the receiver-operating characteristic (ROC) curve may be calculated, the precision recall may be calculated, the classification error may be calculated, and/or other performance metrics may be calculated.

The performance metrics may be calculated persistently, at intervals, in response to user requests, and/or the like. As described above, the output data may be time stamped (e.g., in metadata) such that the performance metrics may be calculated over certain time periods. For example, if the performance metric were the AUC for the ROC curve, the AUC for the ROC curve may be calculated and/or stored, without limitation, per minute, per hour, per day, per week, etc. A user may be able to define the time periods, the time periods may be predefined, default, and/or set by the model training system 102, or a combination thereof.

In any example, the performance metrics may be calculated and/or generated for time periods to enable the performance analyzer 116 to compare the performance metrics at one time to the performance metrics at another time(s) in order to detect performance anomalies. For example, the performance metrics may be compared persistently, at intervals, as requested by a user, and/or at other times to the prior and/or subsequent performance metrics for the trained model 110 (and/or the deployed model 124, as discussed with respect to FIG. 1B below). As mentioned herein, the time period associated with an instance of a performance metric may be referred to as the granularity of the performance metric, and the period of time that the instance of the performance metric is compared to may be referred to herein as the comparative period. For example, if an instance of a performance metric were calculated each day, and the instance of the performance metric were compared to the other instances of the performance metrics from the previous year, "each day" would be the granularity and the "previous year" would be the comparative period.

To detect a performance anomaly, any of a number of methods may be used. For example, different multipliers of SD (e.g., SD, 2SD, 3SD, etc.), range, or IQR (e.g., 1.5IQR, IQR, 2IQR, etc.) may be used to detect anomalies. In addition to SD, range, and/or IQR, other methods may be used to calculate and measure differences between the performance metrics over time for detecting performance anomalies.

As an example, if the method used for detecting performance anomalies is the IQR, the AUC for the ROC curve is the performance metric (e.g., the AUC for the ROC curve of the accuracy of the output data as compared to the ground truth data), and the performance metric is measured on an hourly basis, a performance anomaly may be detected for a given hour when the AUC for the ROC curve falls outside of the IQR as compared to the AUC for the ROC curve calculated for other hours (e.g., some or all of the hours prior to and/or subsequent to the given hour).

Referring now to FIG. 1B, a schematic depiction is provided illustrating an example model deployment system 118 in which some embodiments of the present disclosure may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The model deployment system 118 may include, among other things, a raw input data store(s) including raw input data 120, an input data store(s) including preprocessed input data 122 (e.g., after preprocessing the raw input data 120), a deployed model 124, the input analyzer 112, the output analyzer 114, the performance analyzer 116, a contribution determiner 126, and/or a report generator 128. Although the input analyzer 112, the output analyzer 114, and the performance analyzer 116 are labeled with the same reference number in both FIG. 1A and FIG. 1B, this is not intended to be limiting. In some examples, the model training system 102 and the model deployment system 118 may include separate input analyzers, output analyzers, and/or performance analyzers. In addition, as described herein, in some examples the trained model 110 may be the same as the deployed model 124, while in other examples, the trained model 110 may be used to generate the deployed model 124. The model deployment system 118 (and the components and/or features thereof) may be implemented using one or more computing devices, such as the computing device 600 of FIG. 6, described in more detail below.

The raw input data 120 may be similar to the raw training data 104, except that the raw input data 120 is input into the deployed model 124. For example, the raw input data 120 may include any type of raw data that may be input into the deployed model 124 to generate output data. The raw input data 120 may be collected, generated, and/or obtained from any number of sources, such as files, databases, data stores, sensors, and/or other sources. In some examples, the raw input data 120 may be used directly by the deployed model 124 (e.g., with no or minimal preprocessing), such as when the deployed model 124 is a convolutional neural network. In such examples, the input data store(s) and the accompanying preprocessed input data 122 may not be included in the model deployment system 118. In some examples, a combination of the raw input data 120 and the preprocessed input data 122 may be used by the deployed model 124 to generate the output data. In other examples, the deployed model 124 may only use the preprocessed input data 122 for generating the output data. In other words, the raw input data 120, the preprocessed input data 122, or a combination thereof may be used by the deployed model 124 to generate the output data.

The preprocessed input data 122 may include the raw input data 120 after preprocessing. For example, similar to described above with respect to the raw training data 104 of the model training system 102 of FIG. 1A, data preprocessing may be performed by the model deployment system 118 to convert the raw input data 120 into a clean (e.g., usable) data set (e.g., the preprocessed input data 122).

In some examples, after preprocessing, and similar to the raw training data 104 (and/or the training data 106) of the model training system 102 of FIG. 1A described above, the raw input data 120 (and/or the preprocessed input data 122) may undergo data wrangling (or data munging).

The deployed model 124 may be generated, at least in part, by the training component 108 of the model training system 102 using the raw training data 104 and/or the training data 106. As described above, the deployed model 124 may be the trained model 110, may be one of the trained models 110 (e.g., where A/B testing was performed), and/or may be the trained model 110 after additional accuracy checking, retraining, in-deployment training (e.g., continuous training during deployment), and/or the like. The trained model 110 may include one or more models, such A/B models that are tested.

The deployed model 124 may be analyzed by the input analyzer 112, the output analyzer 114, and/or the performance analyzer 116 to generate the input data metrics, the output data metrics, and/or the performance metrics of the deployed model 124. The input data metrics, the output data metrics, and the performance metrics of the deployed model 124 may be calculated similarly to the input data metrics, the output data metrics, and the performance metrics of the trained model 110, described herein. In addition, the detection of input data anomalies, output data anomalies, and performance anomalies of the deployed model 124 may be calculated (and/or determined) similarly to the input data anomalies, the output data anomalies, and the performance anomalies of the trained model 110, described herein. Further, the input data metrics, the output data metrics, and the performance metrics of the deployed model 124 may be compared against the input data metrics, the output data metrics, and the performance metrics of the trained model 110, and vice versa. For example, an instance of an output data metric of the deployed model 124 may be compared against prior and/or subsequent instances of the output data metric of the deployed model 124 and/or the trained model 110 for detecting input data anomalies. Similarly, as another example, an instance of an output data metric of the trained model 110 may be compared against prior and/or subsequent instances of the output data metric of the trained model 110 and/or the deployed model 124 for detecting output data anomalies. In addition, an instance of a performance metric of the deployed model 124 may be compared against prior and/or subsequent instances of the performance metric of the trained model 110 and/or the deployed model 124 for detecting performance anomalies.

The contribution determiner 126 may determine contributions (e.g., degrees of contribution, factors of contribution, and/or the like) for input data anomalies to output data anomalies and/or performance anomalies. For example, the contribution determiner 126 may determine that an input data anomaly is a source of contribution to an output data anomaly and/or a performance anomaly. In addition, the contribution determiner 126 may determine a degree of contribution (e.g., a relative amount of contribution of the input data anomaly to the output data anomaly and/or the performance anomaly). In examples where there are two or more input data anomalies that are determined to have contributed to an output data anomaly and/or a performance anomaly, the degrees (or factors) of contribution of each output data anomaly may be determined (or used, such as where already determined) to identify the input data anomalies that may have the most causal effect on the output data anomaly and/or the performance anomaly.

The contribution determine 126 may determine that an input data anomaly has contributed to an output data anomaly and/or a performance anomaly using one or more of a variety of methods, including, but not limited to, those described herein. For example, when an output data anomaly and/or a performance anomaly are detected, a time (or time frame) may be determined (e.g., using timestamps of the output data) for the output data anomaly and/or the performance anomaly. The input data from the same or similar time (or time frame), may then be analyzed (and/or the results of prior analysis may be determined) to determine whether an input data anomaly has been detected at the time (or within the time frame) (e.g., using timestamps of the input data).

For example, depending on the input data and/or the output data, the correlations between the input data and the output data (and consequently the performance) may be immediate. In such an example, when input data is fed into the deployed model 124 at a time (or time frame), the output data may reflect the input data fed into the deployed model 124 at the time (or the time frame). As a more specific example, if the deployed model 124 is for predicting a likelihood of loan approval based at least in part on age and income, input data (e.g., age and income) may generate real-time (or near real-time) output data providing an "approved" or "not approved" output. In such an example, when an output data anomaly and/or a performance anomaly is detected, any input data anomaly corresponding to the input data at the time (or within the time frame) may be determined to have contributed to the output data anomaly and/or the performance anomaly.

In some examples, a time or time frame associated with output data anomalies and/or performance anomalies may not be the same time or time frame associated with input data anomalies. For example, input data input into the deployed model 124 (and/or the trained model 110) may materialize in output data (and resultantly in performance of the model) at a later time (or time frame) than the time (or time frame) associated with the output data that corresponds to the output data anomaly and/or the performance anomaly. In such an example, the input data and/or the output data may be analyzed by the contribution determiner 126 to determine a time (or time frame) for input data that contributed to the output data that corresponds to the output data anomaly and/or the performance anomaly. As a more specific example, if the deployed model 124 used login attempts and duration of interaction with an application during a month long trial period to determine a number of members likely to convert to a paid subscription on a given day, the input data (e.g., login attempts and duration of interaction) may have been input into the deployed model 124 at a time (or time frame) prior to a time (or time frame) corresponding to the output data associated with the output data anomaly and/or performance anomaly.

To determine which input data contributes to the output data that corresponds to the output data anomaly and/or the performance anomaly, historic input data and/or historic output data may be used. For example, a difference in time (e.g., a time lag) between the input data used to train the trained model 110 and the output data generated as a result of the input data may be learned. Additionally, or alternatively, a difference in time (e.g. a time lag) between the input data used for the deployed model 124 and the output data generated as a result of the input data may be learned. As a result, the difference between a first time (or time frame) of when certain types of input data (e.g., features of the input data) may be input into the deployed model 124 (and/or the trained model 110) and a second time (or time frame) of when output data is generated based at least in part on the certain types of input data may be determined by the contribution determiner 126.

In addition, the certain types of input data may be associated with the output data by the system (e.g., the model training system 102 and/or the model deployment system 118) such that when an output data anomaly and/or a performance anomaly are detected, the input data associated with the output data that corresponds to the output data anomaly and/or the performance anomaly may be identified. For example, if a certain type of model output is determined to be generated by input data with a time lag (e.g., input data input into the deployed model 124 and/or the trained model 110 prior to the generation of the output data), the system may be aware of what input data to analyze for input data anomalies. Thus, input data from a time (or time frame) prior to the time (or time frame) of the output data may be identified and analyzed (or results from a prior analysis may be obtained) to determine whether any input data anomalies were detected.

In some examples, to learn the association between the input data and the output data, another machine learning model may be trained (e.g., by the model training system 102 and/or the model deployment system 118). For example, the machine learning model may learn time-based associations between input data and output data of the trained model 110 and/or the deployed model 124. The time-based associations may then be used when an output data anomaly and/or a performance anomaly is detected, to determine the input data (or at least some of the input data) that contributed to the output data anomaly and/or the performance anomaly. The time-based associations learned by the machine learning model may include associations between input data and output data with a time lag and/or real-time or near real-time time-based associations.

Although another machine learning model is discussed with respect to determining the time-based associations between the input data and the output data, this is not intended to be limiting. For example, the training model 110, the deployed model 124, and/or another machine learning model(s) may be used to determine the associations (including the time-based associations) between the input data and the output data.

Once a determination of a contribution of each input data anomaly to the output data anomaly and/or the performance anomaly is made, the contribution determiner 126 may determine the degree (or factor) of contribution of each input data anomaly to the output data anomaly and/or the performance anomaly. For example, where two or more input data anomalies are detected, a relative contribution of each input data anomaly to the output data anomaly and/or the performance anomaly may be determined.

In some examples, to determine the degree (or factor) of contribution, the divergence from a predefined standard or mean (e.g., SD, 2SD, IQR, 1.5IQR, etc.) may be determined for the input data metrics associated with each input data type that corresponds to the input data anomalies. In other words, as described herein with reference to detecting input data anomalies, metrics for input data types at one instance (e.g., at a granularity of one hour, or one day, or one week, or one month) may be compared against the metrics for the input data types over a period of time (e.g., a day, a week, a month, a year, etc.) to determine whether the metrics at the instance are outside of a predefined threshold (e.g., 2SD, range, IQR, etc.). Each input data anomaly has been determined based at least in part on an input data metric for an input data type falling outside of the predefined threshold.

As a result, the distance from the standard or mean can be used as an indicator of contribution of the input data anomaly to the output data anomaly and/or the performance anomaly. For example, assume that the standard or mean (e.g., the threshold) is 2SD, or in other words, any input data corresponding to an input data metric that falls outside of two times the standard deviation is deemed anomalous. Further assume that an output data anomaly is determined to have been caused by a first input data anomaly associated with a first input data metric of 3.7SD, and a second input data anomaly associated with a second input data metric of 4.8SD. In such an example, the second input data anomaly would be determined, by the contribution determiner 126, to have a higher degree (or factor) of contribution to the output data anomaly than the first input data anomaly because 4.8SD is farther from the standard or mean (e.g., further outside the predefined threshold) than 3.7SD. As a result, the second input data anomaly may be presented in a graphical user interface (GUI) prior to the first input data anomaly (e.g., in a rank ordered list), as described in more detail herein with respect to the report generator 128.

In examples, to determine the degree (or factor) of contribution, another machine learning model may be trained to learn the impact or effect of the input data on the output data of the trained model 110 and/or the deployed model 124. Additionally or alternatively, this machine learning model (or another model) may learn the performance of the trained model 110 and/or the deployed model 124 as a function of the input data. In either example, the degree (or factor) of contribution between each of the input data types and the output data and/or the corresponding performance may be learned by machine learning model.

In such examples, an output of the machine learning model(s) may be coefficients associated with each of the input data types (e.g., the features of the input data), where the coefficients represent the relative contribution of the input data types with respect to the output data and/or the corresponding performance. For example, with reference to the example used herein for loan approvals using age and income, the machine learning model may learn the impact (e.g., the degree of contribution) of both age and income on the output data (e.g., whether a person is approved or not approved). During training, the machine learning model may determine that no matter the age of the person, when the income is less than $75,000 per year, the approval rate is below 10% and when the income is more than $200,000 per year, the approval rate is over 95%. In such an example, the machine learning model may determine that the coefficient for age is less than the coefficient for income (e.g., the impact of age on the approval process is less than the impact of income on the approval process). In such an example, when a first input data anomaly is determined with respect to the input data corresponding to age and a second input data anomaly is determined with respect to the input data corresponding to income, the second input data anomaly may be determined to have a higher degree (or factor) of contribution to the output data anomaly and/or the performance anomaly. As such, as will be described in greater detail below, the report generator 128 may generate a report including the income based input data anomaly first, and/or may list the income based input data anomaly with a higher degree (e.g., percentage) of contribution to the output data anomaly and/or the performance anomaly.

Although another machine learning model is discussed with respect to determining the contribution of the input data anomalies to the output data anomalies and/or the performance anomalies, this is not intended to be limiting. For example, the training model 110, the deployed model 124, and/or another machine learning model(s) may be used to determine the contribution of the input data anomalies to the output data anomalies and/or the performance anomalies The report generator 128 may generate reports (e.g., report(s) 214 of FIG. 2B) that are indicative of input data anomalies, output data anomalies, and/or performance anomalies. In addition, the report generator 128 may include information as to the contribution of the input data anomaly(ies) to the output data anomaly(ies) and/or the performance anomaly(ies). For example, a report generated by the report generator 128 may include each input anomaly that contributed to an output data anomaly and/or a performance anomaly.

In examples where there is more than one input data anomaly that contributed to an output data anomaly and/or a performance anomaly, each of the input data anomalies may be included in the report. Each of the input data anomalies may include a degree, factor, and/or percentage of contribution to the output data anomaly and/or performance anomaly. For example, the degree, factor, and/or percentage of contribution for each of the data types may be included in the report, where the degree, factor, and/or percentage of contribution is based at least in part on the coefficients associated with each of the data types corresponding to the input data anomalies as calculated using one or more machine learning models, is based at least in part on the distance from the standard or mean of the input data metrics, and/or is based at least in part on another factor(s). The input data anomalies may be listed in rank order (e.g., highest contributors first, lowest contributors last, and so on).

The report generator 128 may generate the reports persistently, at intervals, upon user request, and/or at another cadence. The reports may be generated based at least in part on user programs, such as one report a day, one report a week, one report a month, etc. The reports may be transmitted to a client device(s) associated with users of the model deployment system 118. For example, the reports may be included in messages (e.g., signals) that are transmitted to the client device(s) (e.g., persistently, at intervals, upon user requests, etc.). In some examples, once a user opens an application and/or a graphical user interface (GUI) on a client device, one or more messages including the reports may be obtained (e.g., downloaded, retrieved, received, etc.) from the model deployment system 118 (and/or another system). For example, the data representing the reports may be stored on one or more servers associated with a system, and upon request, upon opening an application, and/or upon accessing a GUI associated with the report(s), the messages including the report(s) may be downloaded to the client device.

Once the messages are received by the client device(s), the necessary data for generating the reports may be accessible to the client device(s). For example, once received, if the application is not open and/or a GUI for viewing the reports is not open, a notification may be generated. The notification may be a push notification (e.g., a ribbon, banner, pop-up, etc.), an in-application notification (e.g., a number representative of a number of reports available for viewing, or other symbol), and/or may be another type of notification. In examples where the application and/or the GUI is open, the reports may be populated within the application and/or the GUI. The reports may include a listing of input data anomalies, output data anomalies, and/or performance anomalies and/or one or more visual representations thereof (e.g., charts, graphs, tables, etc.), as described in more detail herein with respect to FIGS. 3A-3D.

In some examples, the report generator 128 may generate recommendations. For example, the recommendations may include fixes for correcting the input data anomalies. In addition, the recommendations as to what input data (e.g., the input data types or features) to look at, a time frame for looking at the input data (e.g., based at least in part on the time-based associations described herein), and/or other recommendations. By generating these recommendations that include not only the input data anomaly(ies), the output data anomaly(ies), and/or the performance anomaly(ies), but also the contribution determination (e.g., the degree of contribution as determined by the contribution determiner 126), the amount of processing power, bandwidth requirements, and other computing resource requirements are significantly reduced because these additional resources are not needed for performing the manual run-through of all of the input data and output data to find causality. In addition, because the issues identified in the report(s) may be related to underlying data quality issues, the data quality issues can be repaired without retraining the deployed model 124. By not retraining the model 124, especially where retraining the model 124 would not fix the underlying issue (e.g., because retraining a model when data quality is the issue does not fix the data quality issue), additional significant computing and bandwidth resources are saved (e.g., because retraining a model is significantly more computing resource intensive than fixing an input data quality issue).

In some examples, however, the report generator 128 may recommend retraining the deployed model 124. For example, when the input data anomaly can be attributed to a data distributional shift (e.g., as based at least in part on input data metrics calculated using KL divergence), the recommendation may be to retrain the model based at least in part on the distributional patterns recognized by the input data of the deployed model 124 (e.g., the raw input data 120 and/or the preprocessed input data 122) as compared to the input data of the trained model 110 (e.g., the raw training data 104 and/or the training data 106). In such examples, the resources required to retrain a model are only used when necessary and, still, computing and bandwidth resources are saved by not needing to manually search for the cause of the output data anomalies and/or performance anomalies prior to deciding to retrain the model.

Figure 2A:
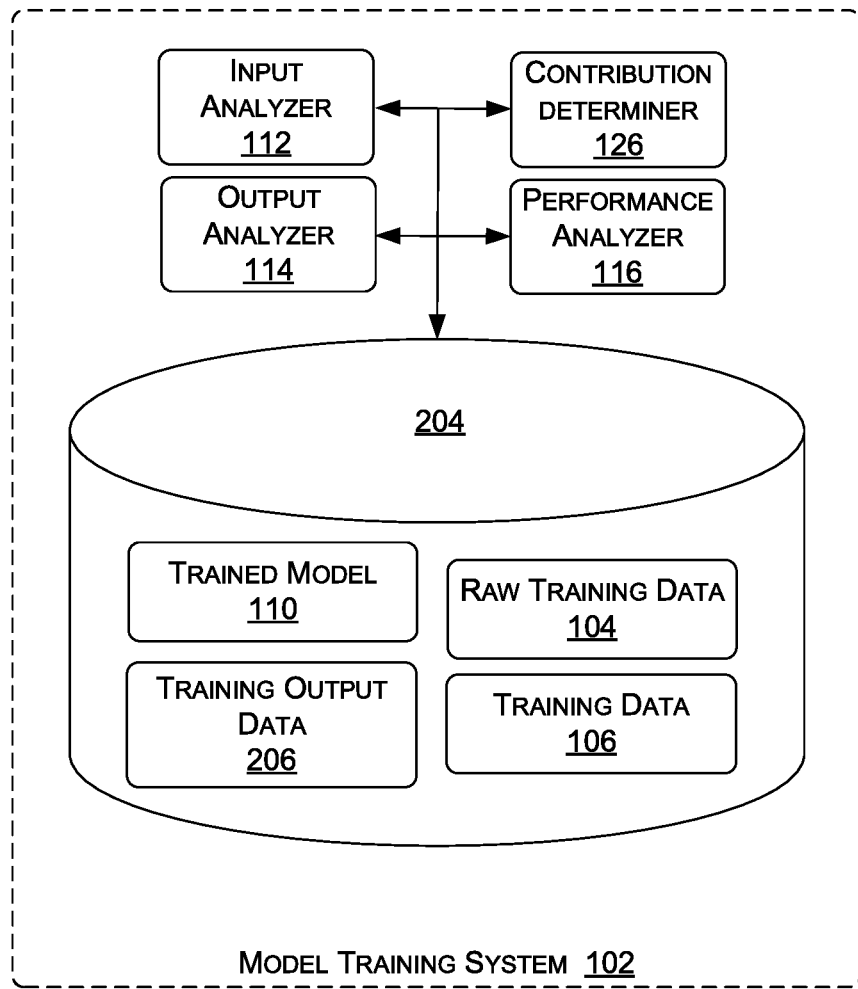
FIG. 2A is a block diagram depicting an example of a model training system in accordance with some embodiments of the present disclosure.

Now referring to FIG. 2A, FIG. 2A is a block diagram depicting an example of a model training system in accordance with some embodiments of the present disclosure. Model training system 102 may correspond to the model training system 102 of FIG. 1A. Model training system 102 may include the input analyzer 112, the output analyzer 114, the contribution determiner 126, the performance analyzer 116, data store(s) 204, and/or additional components.

The data store(s) 204 may include the raw training data store(s) of FIG. 1A, the training data store(s) of FIG. 1A, and/or other data store(s), such as data store(s) for storing training output data 206. The data store(s) 204 may include the trained model 110, the training output data 206, the raw training data 104, the training data 106, and/or other data (e.g., data representative of the performance of the trained model 110 as determined by the performance analyzer 116, data representative of the contributions of various input data types or features as determined by the contribution determiner 126, etc.). However, although the contribution determiner 126 is not included in the model training system 102 with respect to FIG. 1A, this is not intended to be limiting. For example, the model training system 102 may include the contribution determiner 126 for determining the degree (or factor) of contribution of different input data types (or features) to the output data and/or the performance. As described herein, the contribution determinations for the trained model 110 as well as the deployed model 124 can be used by the model deployment system 118 to determine the degrees (or factors) of contributions of input data anomalies to the output data anomalies.

The training output data 206 may include outputs of the trained model 110. For example, when referencing output data of the trained model 110 herein, the training output data 206 may be included in this output data. In some examples, output data metrics may be calculated for the training output data 206. These output data metrics may then be compared to the output data metrics for the output data 212 (FIG. 2B) to detect output data anomalies and/or performance anomalies, processes for which are described herein.

Figure 2B:
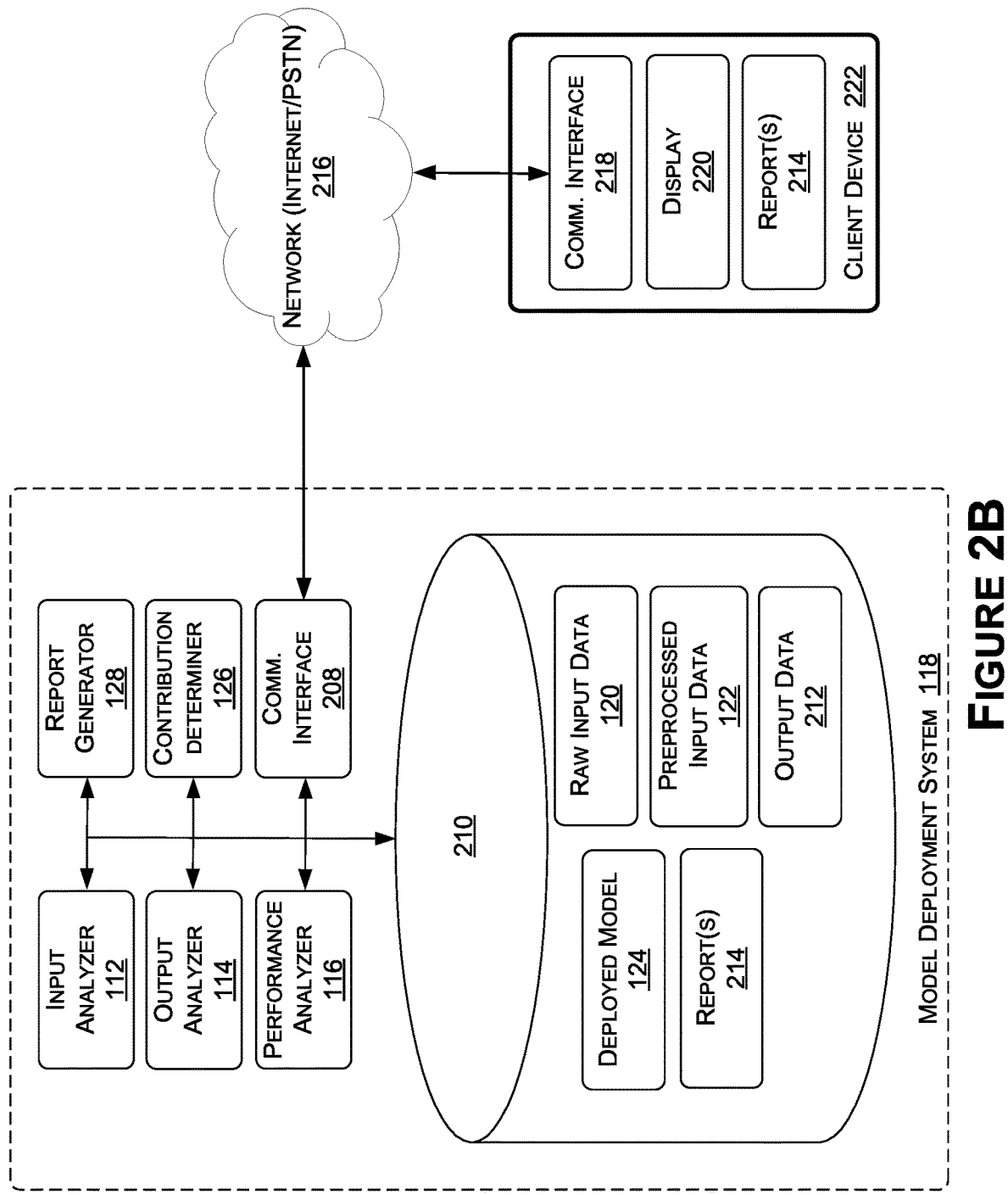
FIG. 2B is a block diagram depicting an example of a model deployment system in accordance with some embodiments of the present disclosure.

FIG. 2B is a block diagram depicting an example of a model deployment system in accordance with some embodiments of the present disclosure. Model deployment system 118 may correspond to the model deployment system 118 of FIG. 1B. Model deployment system 118 may include the input analyzer 112, the output analyzer 114, the contribution determiner 126, the performance analyzer 116, the report generator 128, data store(s) 210, and/or additional components or features.

The data store(s) 210 may include the raw input data store(s) of FIG. 1B, the preprocessed input data store(s) of FIG. 1B, and/or other data store(s), such as data store(s) for storing the output data 212. The data store(s) 210 may include the deployed model 124, report(s) 214, the raw input data 120, the preprocessed input data 122, output data 212, and/or other data (e.g., data representative of the performance of the deployed model 124 as determined by the performance analyzer 116, data representative of the contributions of various input data types or features as determined by the contribution determiner 126, etc.).

The output data 212 may include outputs of the deployed model 124. For example, when referencing output data of the deployed model 124 herein, the output data 212 may be included in this output data. In some examples, output data metrics may be calculated for the output data 212. These output data metrics may then be compared to the output data metrics for the trained output data 206 (FIG. 2A) to detect output data anomalies and/or performance anomalies, processes for which are described herein.

The communication interface 208 may include one or more components, features, modules, and/or the like for communicating over one or more networks (e.g., the Internet, local area networks (LANs), wide area networks (WANs), low power wide area networks (LPWANs), cellular networks (e.g., LTE, 4G, 5G, etc.), public switched telephone networks (PSTN), Internet of things (IoT) networks (e.g., z-wave, ZigBee, etc.), and/or other network types.

The model deployment system 118 may be connected (e.g., communicatively coupled) to the network (Internet/PSTN) 216 via the communication interface 208. The model deployment system 118 may communicate with the model training system 102, the client device(s) 222, and/or one or more other systems or devices. The model deployment system 118 may transmit one or more messages (e.g., signals) to the client device(s) 222, where the messages include the report(s) 214 and/or data for generating the report(s) 214. The model deployment system 118 may further transmit other data for use by the client device(s) 222

(e.g., for use by an application associated with training, deploying, and/or monitoring the performance of one or more machine learning models).

The client device(s) 222 may include one or more of a smart phone, laptop computer, desktop computer, tablet computer, wearable device (e.g., a smart watch, intelligent eye glasses, etc.), smart-home device, such as smart-home devices including digital personal assistants (e.g., AMAZON ECHO, GOOGLE HOME, etc.), and/or any other type of device. In some examples, the client device(s) 222 may include some or all of the features and functionality of the computing device 600 of FIG. 6, described below.

The client device(s) 222 may include a communication interface 218, similar to the communication interface 208, for communication with one or more other devices and/or systems. The client device(s) 222 may receive the report(s) 214 and/or other data and information related to input data, output data, and/or performance of the trained model 110, the deployed model 124, and/or any other machine learning models from the model deployment system 118, the model training system 102, other client device(s) 222, and/or other devices and systems.

The client device(s) 222 may include one or more applications for presenting information (e.g., the report(s) 214) to the user. The application(s) may output the information via the display 220. The application(s) may include one or more graphical user interfaces (GUIs) for viewing, interacting with, and/or navigating through the report(s) 214 and/or information generated by the model deployment system 118, the model training system 110, other client device(s) 222, and/or other devices or systems. FIGS. 3A-3D, described in more detail below, illustrate examples of GUIs for displaying the report(s) 214 and/or other information.

Although the model training system 102 and the model deployment system 118 are illustrated as separate systems, this is not intended to be limiting. For example, the model training system 102, the model deployment system 118, and/or one or more other systems may be the same system, may share one or more features and/or components, and/or may otherwise be combined. In addition, although the model deployment system 118 is illustrated as being connected to the network 216 and a client device 222, this also is not intended to be limiting. For example, the model training system 102, the model deployment system 118, and/or one or more other systems may be connected to (e.g., communicatively coupled to) the network 216 and/or the client device 222 (and/or other client devices). In addition, the model training system 102, the model deployment system 118, and/or one or more other systems may be connected to each other via the network 216 (e.g., communicatively coupled). As such, the model training system 102 may include a communication interface, similar to the communication interface 208 of the model deployment system 118.

Now referring to FIGS. 3A-3D, FIGS. 3A-3D include example screenshots of a graphical user interface(s). The GUI(s) may be from an application for training, viewing (e.g., the reports 214 of FIG. 2B), error checking, and/or other tasks of machine learning models. Although some screenshots show some features, and other screenshots show other features, this is not intended to be limiting. For example, any of the screenshots may include features from any other screenshots, and/or may include features not included in the screenshots but described herein.

Figure 3A:
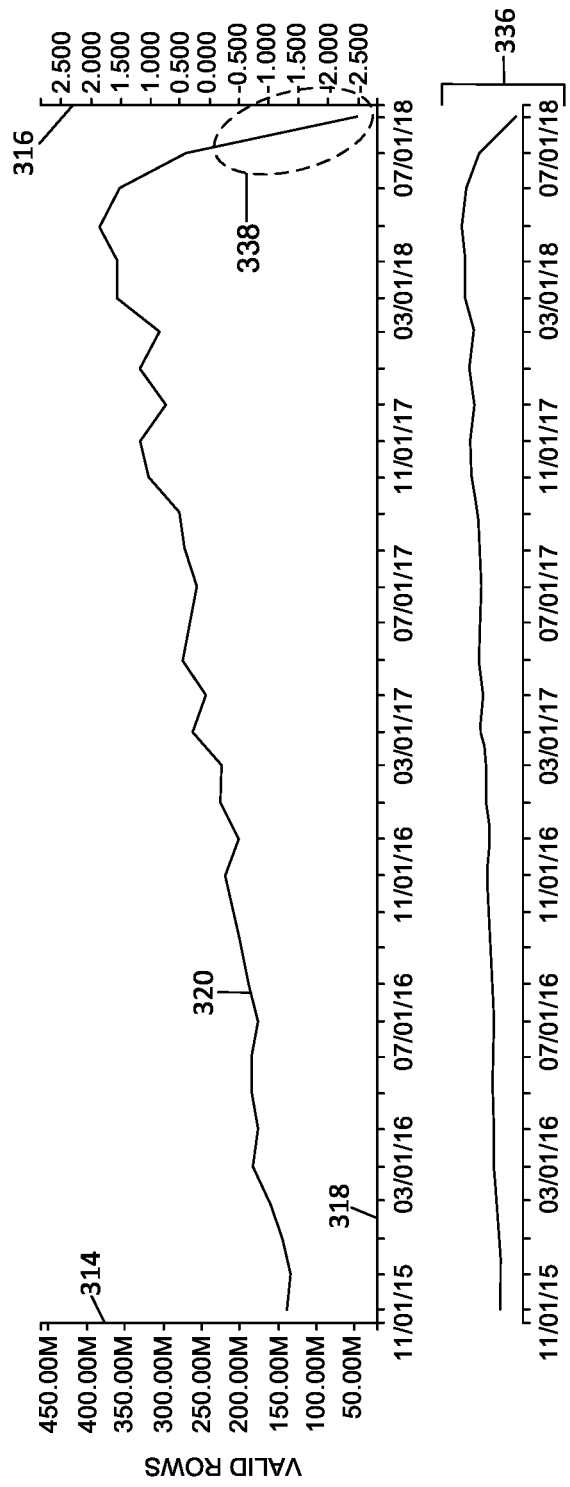
FIG. 3A is an example screenshot from a graphical user interface (GUI) for displaying and reporting machine learning model performance in accordance with some embodiments of the present disclosure.

FIG. 3A is an example screenshot 302 from a graphical user interface (GUI) for displaying and reporting machine learning model performance in accordance with some embodiments of the present disclosure. The screenshot 302 includes a chart of a number of valid rows over time. For example purposes, the screenshot 302 may include a chart of input data for the deployed model 124.

The GUI may include a date range control element 304. The date range control element 304 may allow a user to input a range of dates (or times) for viewing a desired metric (in this case, the number of valid rows of input data).

The GUI may further include a granularity (an aggregation type) control element 306. The granularity control element 306 may allow a user to select the periods of time (e.g., the comparative period) for which the points along the x-axis relating to the desired metric (e.g., the number of valid rows) should be populated. For example, in the screenshot 302, the granularity control element 306 has been used to select a month. As such, each point plotted along the x-axis are indicative of the number of valid rows (e.g., the mean of the number of valid rows) for each month within the range of dates selected by the user using the date range control element 304.

The GUI further includes an anomaly detection control element 308. The anomaly detection control element 308 may allow a user to select the type of dispersion (or anomaly detection) algorithm to use for determining if one or more anomalies are present in the data (e.g., in this case, if any anomalies are detected over the date range for the number of valid rows of input data).

The GUI further includes a batch selection control element 310. The batch selection control element 310 may allow the user to select a batch file to be used by the GUI when generating the chart (or table).

The GUI further includes a chart/table control element 312. The chart/table control element 312 may allow the user to select the format the data is displayed (e.g., as a chart or as a table).

The GUI further includes a chart having a y-axis 314 (in this example, a number of valid rows, plotted as the mean of the valid rows over the date range), a normalized y-axis 316 (in this example, a normalized number of valid rows), an x-axis 318 (in this example, dates from within the date range), and a plot 320 (in this example, the number of valid rows as a function of time).

The GUI further includes a table with information pertaining to the plot 318 (e.g., information about the data used for generating the plot 318). For example, any number of metrics may be listed in the table, such as, without limitation, a first metric 322 (in this example, duplicate rows), a second metric 324 (in this example, % of duplicate rows), and a third metric 326 (in this example, a number of valid rows).

The first metric 322, the second metric 324, and the third metric 326, in the screenshot 302, include metrics for the input data of a machine learning model. The metrics may be calculated and/or displayed using any metric type 328, such as those described herein. In the screenshot 302, the metric type 328 includes the mean. As such, the first metric 322, the second metric 324, and the third metric 326 are all displayed as a function of a mean.

The dispersion type 330 (in this example, the standard deviation) may also be calculated and/or displayed. In the screenshot 302, the standard deviation is displayed for the first metric 322, the second metric 324, and the third metric 326.

The table may further include a visibility control element 332 that may allow a user to select whether or not to display the metrics in the chart (in this example, only the third metric 326, number of valid rows, is toggled "on"). The table may further include a focus control element 334 that may allow a user to view a more simple view of the plot (e.g., the focused plot 336).

The GUI may allow the user to view anomaly(ies) in the data (in this example, input data anomalies). For example, looking at the third metric 326—the number of valid rows—and the metric type—the mean—the mean number of valid rows over the date range is 239,004,611. The dispersion type 330—the standard deviation—is 77,602,311. As such, in this example, any data points lying outside of the standard deviation from the mean number of valid rows may be determined to be anomalous (e.g., indicative of an input data anomaly corresponding to the number of valid rows in the screenshot 302). As such, on Aug. 1, 2018, the number of valid rows was only about 60,000,000 (e.g., approximately 179,004,611 different than the mean), well outside of the standard deviation of 77,602,311. As such, an anomalous condition 338 may be identified in the GUI. In some examples, the anomalous condition 338 may be highlighted (e.g., circled (or otherwise highlighted with another shape), as illustrated in the screenshot 302, bolded, shown in a different color, etc.). In other examples, the anomalous condition 338 may not be highlighted, but may be evident from the chart.

Figure 3B:
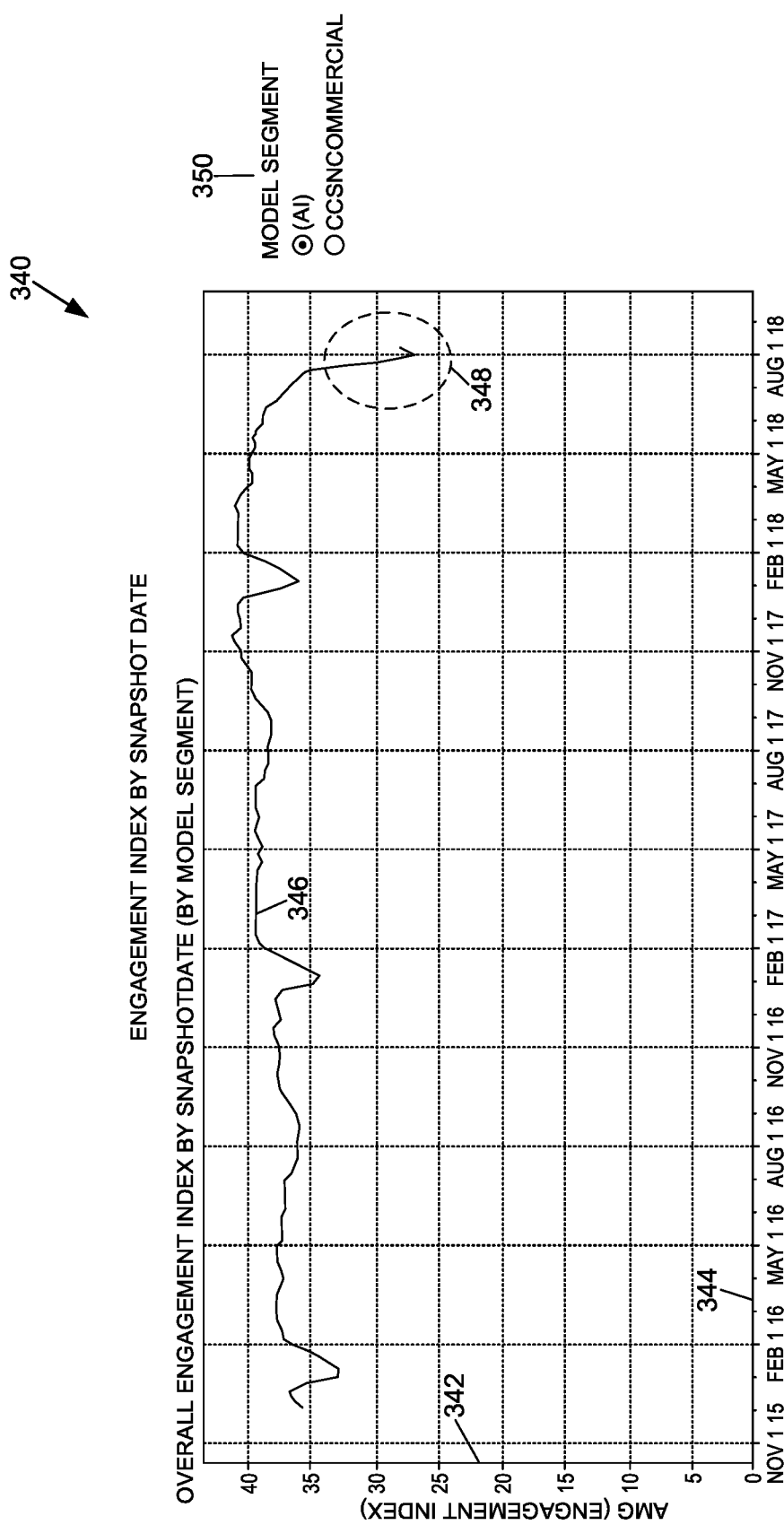
FIG. 3B is another example screenshot from a graphical user interface (GUI) for displaying and reporting machine learning model performance in accordance with some embodiments of the present disclosure.

FIG. 3B is another example screenshot 340 from a graphical user interface (GUI) for displaying and reporting machine learning model performance in accordance with some embodiments of the present disclosure. For example purposes, the screenshot 340 may include a chart of output data for the deployed model 124.

The GUI may include a chart having a y-axis 342 (in this example, an average engagement index), an x-axis 344 (in this example, dates from within the date range from the screenshot 302 of FIG. 3A), and a plot 346 (in this example, the average engagement index as a function of time).

The GUI may allow the user to view anomaly(ies) in the data (in this example, output data anomalies). For example, an anomalous condition 348 may be detected and/or identified in the output data as indicated by the chart of screenshot 340. Although not illustrated, the anomalous condition 348 may have been detected by determining an output data metric, a dispersion (or standard) for comparing the output data metric to prior and/or subsequent instances of the output data metric, and determining that the output data metric on Aug. 1, 2018 fell outside of the dispersion (or standard).

In addition, a comparison of input data and output data (e.g., the screenshot 302 and the screenshot 340) over a similar date range may provide a visualization of contributions of input data anomalies to output data anomalies. In the screenshot 340, the average engagement index drops significantly at Aug. 1, 2018, the same date that the anomalous condition 338 was identified in the input data of FIG. 3A. In other words, the effect of the anomalous condition 338 in the number of valid rows on Aug. 1, 2018 can be seen in the anomalous condition 348 of the average engagement index on Aug. 1, 2018. As a result, the charts of the GUI may provide visual evidence that the machine learning model may not need to be retrained (e.g., the machine learning model is not deteriorating), but that the input data has one or more issues leading to a number of invalid rows well beyond the standard.

The GUI may further include a model segment control element 350. The model segment control element 350 may allow the user to select specific market segments for display in the chart (e.g., the user may be interested only in commercial segments, or only in personal segments, or a combination of the two).

Figure 3C:
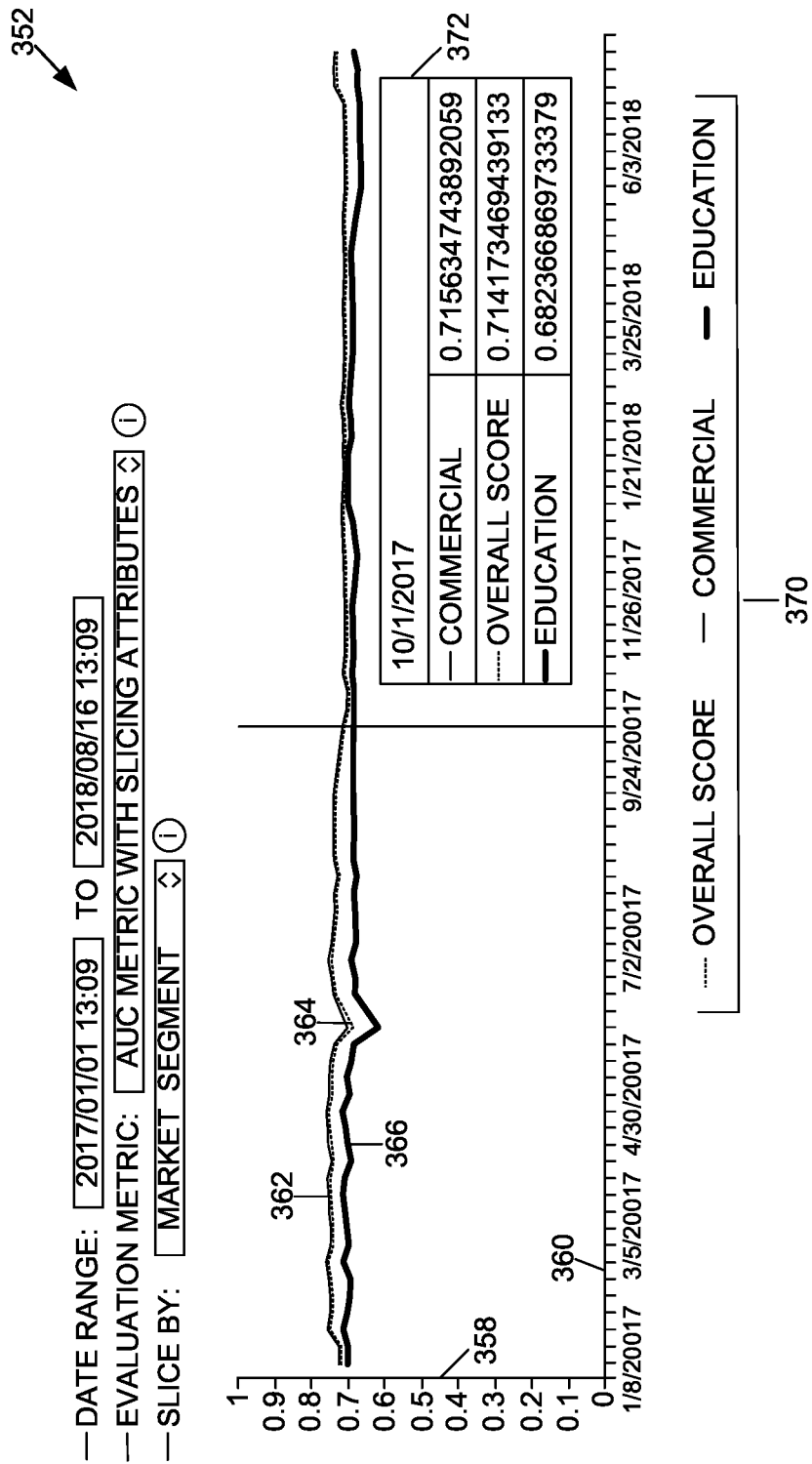
FIG. 3C is another example screenshot from a graphical user interface (GUI) for displaying and reporting machine learning model performance in accordance with some embodiments of the present disclosure.

FIG. 3C is another example screenshot 352 from a graphical user interface (GUI) for displaying and reporting machine learning model performance in accordance with some embodiments of the present disclosure. For example purposes, the screenshot 352 may include a chart of performance of the deployed model 124.

The GUI may include an evaluation metric control element 354. The evaluation metric control element 354 may allow the user to choose the performance metric for evaluating the performance of a machine learning model. In this example, the evaluation metric is the area under the curve with slicing attributes (e.g., with different market segments separately plotted).

The GUI may include a slice control element 356. The slice control element 356 may allow a user to select how slicing should be performed (in this example, by market segments).

The GUI may include a chart having a y-axis 358 (in this example, an area under the curve (AUC) for the performance of the model), an x-axis 360 (in this example, dates from within the date range selected using the date range control element 304), a first plot 362 (in this example, the AUC of the commercial market segment), a second plot 364 (in this example, the AUC for all market segments), and a third plot 366 (in this example, the AUC for the education market segment).

In this example, the performance may not have been effected by the input data anomaly (e.g., the large number of invalid rows). As such, a performance anomaly may not have been detected.

The GUI may include a key 370. The key 370 may include visual identifiers for each of the plots to aid in differentiating what each plot represents. In this example, the plots represent the different market segments that were sliced, including the overall, commercial, and education market segments.

The GUI may include a snapshot table 372. The snapshot table 372 may include a snapshot of the values for a given data point. For example, the user may select a certain date (or select a data point on the plot(s)), and the snapshot table 372 may populate the values for that specific data point. In this example, the snapshot table 372 includes a snapshot of the values of AUC for Oct. 1, 2017, for each of the commercial market segment, the education market segment, and the overall (e.g., including each market segment).

FIG. 3D is another example screenshot 374 from a graphical user interface (GUI) for displaying and reporting machine learning model performance in accordance with some embodiments of the present disclosure. For example purposes, the screenshot 374 may include a report (e.g., one of the reports 214 of FIG. 2B) indicating input data anomalies, output data anomalies, performance anomalies, and/or any relationships there between for the deployed model 124.

The GUI may include a report 376. The report may include an indication that an input data anomaly, an output data anomaly, and/or a performance anomaly was detected. The screenshot 374 includes an indication that an output data anomaly was detected for the deployed model 124, indicating that "The engagement index shows an output data anomaly for August 2018." The screenshot 374 further includes a list of three potential input data anomalies that may have contributed to the output data anomaly (e.g., contributed to the engagement index having an anomaly). For each input data anomaly, the input data type (or feature) may be identified, such as Feature A, Feature B, and Feature C. For example, an input data type (or feature) may be a location of users interacting with a webpage, and the invalid rows may have null values rather than an address or coordinates (e.g., global navigation satellite system coordinates). For each input data anomaly identified, a contribution % may be provided. The degree, factor, or percentage of contribution for different input data anomalies may be determined using any of a variety of methods, including those described herein. In addition, when input data is manifested in output data with a time lag, as described herein, this information may also be included (e.g., as illustrated with the third bullet point).

Now referring to FIGS. 4A-4E and FIG. 5, each block of methods 400A-400E and 500, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Methods 400A-400E and 500 are described, by way of example, with respect to the model training system 102 (FIGS. 1A and 2A) and the model deployment system 118 (FIGS. 1B and 2B). However, these methods may additionally or alternatively be executed by any one system, or any combination of systems, including, but not limited to, those described herein.

Figure 4A:
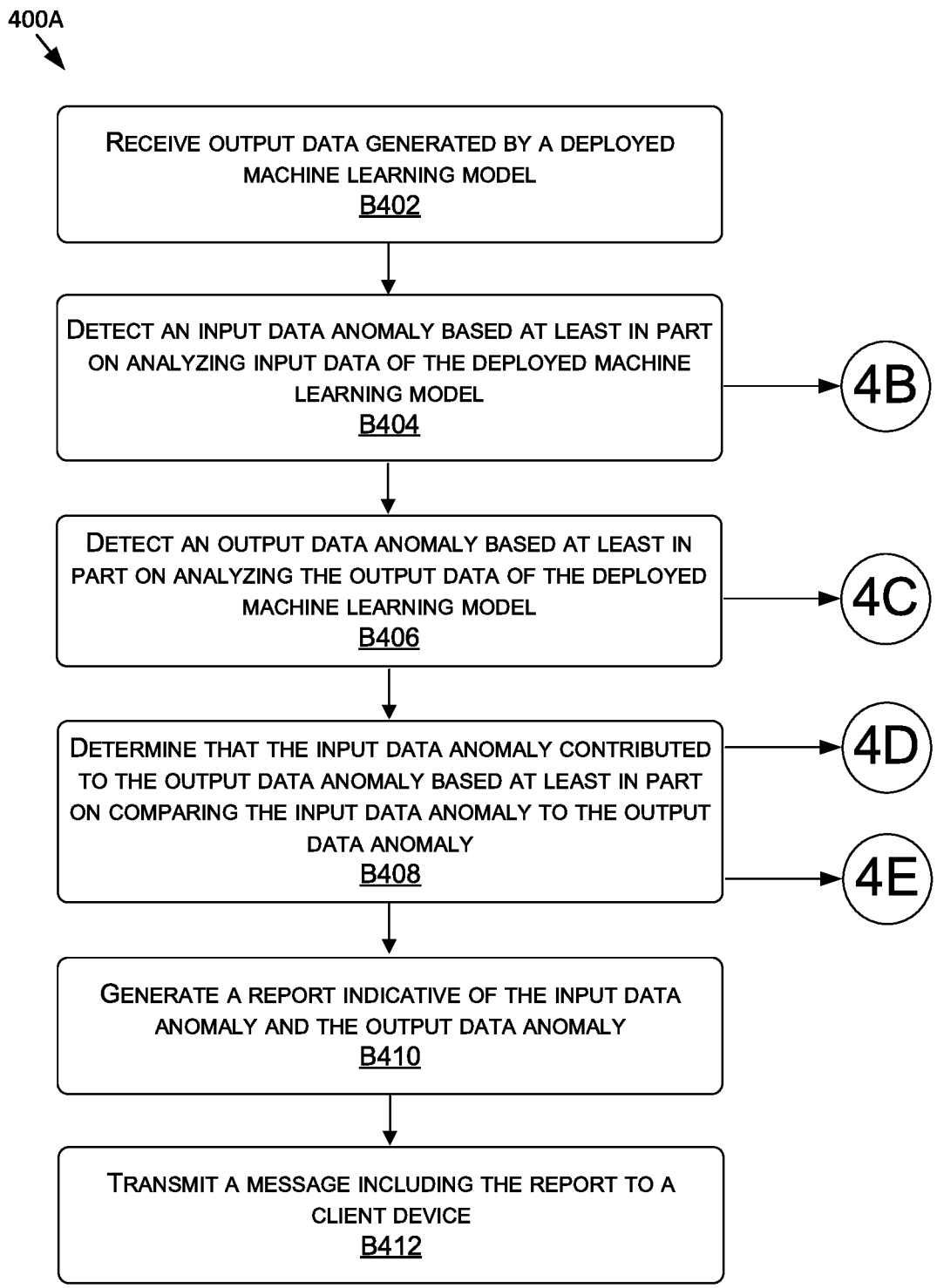
FIG. 4A is a flow diagram showing a method for anomaly detection and reporting for machine learning models in accordance with some embodiments of the present disclosure.

FIG. 4A is a flow diagram showing a method 400A for anomaly detection and reporting for machine learning models in accordance with some embodiments of the present disclosure. At block B402, the method 400A includes receiving output data generated by a deployed machine learning model. For example, the model deployment system 118 may receive the output data 212 generated by the deployed model 124. In some examples, the output data 212 may be generated by one component of the model deployment system 118 (e.g., a first server(s)), and received by another component (e.g., a second server(s)). In other examples, the same components may generate and receive the output data 212.

At block B404, the method 400A includes detecting an input data anomaly based at least in part on analyzing input data of the deployed machine learning model. For example, the model deployment system 118 may detect (e.g., using the output analyzer 114), an input data anomaly based at least in part on analyzing the input data (e.g., the raw input data 120 and/or the preprocessed input data 122) of the deployed model 124. In some examples, as described herein, the detecting the input data anomaly may additionally or alternatively be based at least in part on the analyzing the input data of the trained model 110 (e.g., the raw training data 104 and/or the training data 106). The input data anomalies may be determined by comparing one or more input data metrics to historical input data metrics to determine dispersions (or divergences) that are indicative of input data anomalies, as described herein.

Figure 4B:
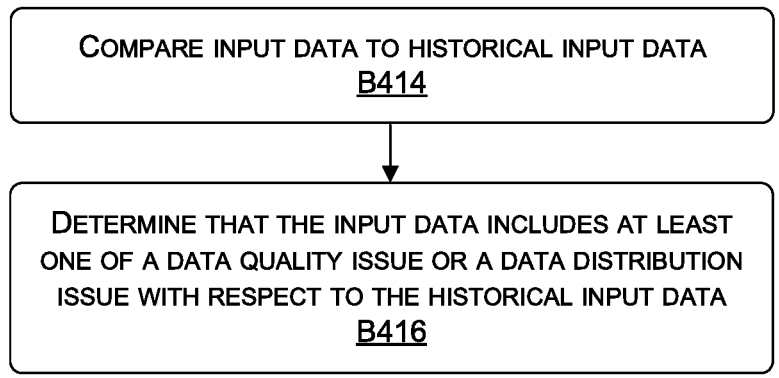
FIG. 4B is a flow diagram showing another method for anomaly detection and reporting for machine learning models in accordance with some embodiments of the present disclosure.

FIG. 4B is a flow diagram showing another method 400B for anomaly detection and reporting for machine learning models in accordance with some embodiments of the present disclosure. The method 400B at block B414 includes comparing input data to historical input data. For example, in order to detect the input data anomaly at block B404 of the method 400A, the model deployment system 118 may compare the input data (e.g., an instance of the input data) to the historical input data (e.g., other instances of the input data prior to or subsequent to the instance of the input data from the trained model 110 and/or the deployed model 124).

The method 400B at block B416 includes determining that the input data includes at least one of a data quality issue or a data distribution issue with respect to the historical input data. For example, based at least in part on the comparing the input data to the historical input data at block B414, the model deployment system 418 (e.g., using input analyzer 112) may determine that the input data (e.g., the raw input data 120 and/or the preprocessed input data 122) includes an input data quality issue or an input data distribution issue. As described herein, an input data quality issue may include a certain number of invalid rows (e.g., a number of invalid rows exceeding a standard deviation), a number of duplicate rows, a number of unparsable data objects, etc. As also described herein, an input data distribution issue may include a shift in distribution of the input data as compared to the historical input data distributions (e.g., input data of the trained model 110 was from a 70% female population, while the input data showing the distributional shift is from only a 20% female population).

Returning to the method 400A, the method 400A at block B406 includes detecting an output data anomaly based at least in part on analyzing the output data of the deployed machine learning model. For example, the model deployment system 118 may detect (e.g., using the output analyzer 114) an output data anomaly based at least in part on analyzing the output data 212 of the deployed model 124. The output data anomalies may be determined by comparing one or more output data metrics to historical output data metrics to determine dispersions (or divergences) that are indicative of output data anomalies, as described herein.

Figure 4C:
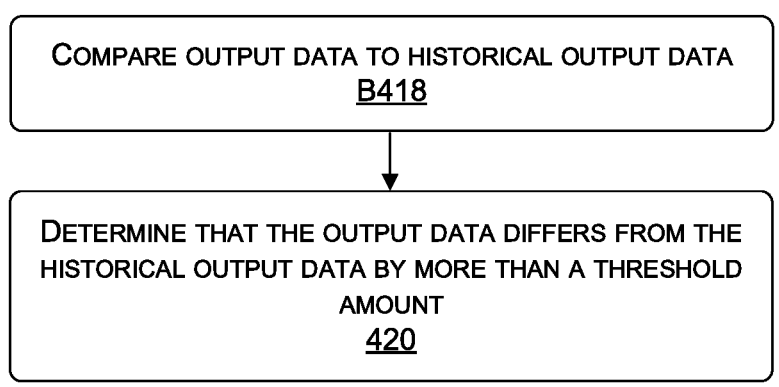
FIG. 4C is a flow diagram showing another method for anomaly detection and reporting for machine learning models in accordance with some embodiments of the present disclosure.

FIG. 4C is a flow diagram showing another method 400C for anomaly detection and reporting for machine learning models in accordance with some embodiments of the present disclosure. The method 400C at block B418 includes comparing output data to historical output data. For example, in order to detect the output data anomaly at block B406 of the method 400A, the output data 212 of the deployed model 124 may be compared to the prior and/or subsequent output data 212 of the deployed model 124 and/or prior and/or subsequent training output data 206 of the trained model 110. As described herein, the comparison may include comparing an instance of an output data metrics to historical instances of the output data metric to determine whether the instance diverges (or disperses) from a standard (e.g., a standard deviation, a range, IQR, etc.) indicative of an output data anomaly.

The method 400C at block B420 includes determining that the output data differs from the historical output data by more than a threshold amount. For example, in order to detect the output anomaly at block B406 of the method 400A, a determination may be made that the output data 212 (e.g., one or more instances of an output data metric calculated from the output data 212) differs from historical output data (e.g., historical instances of the output data metric calculated from the output data 212 and/or the training output data 206) by more than a threshold value. As described herein, the threshold value may include the standard deviation, 2SD, IQR, 1.5IQR, the range, and/or another value. The threshold values may be default, user defined, predefined, and/or the like.

Returning to method 400A, the method 400A at block B408 includes determining that the input data anomaly contributed to the output data anomaly based at least in part on comparing the input data anomaly to the output data anomaly. For example, the model deployment system 118 may determine (e.g., using the contribution determiner 126) that the input data anomaly contributed to the output data anomaly. The determination may be made based at least in part on a comparison of the input data anomaly to the output data anomaly. For example, the comparison may include a time-based comparison (e.g., the time or time frame associated with the input data that corresponds to the input data anomaly as compared to the time or time frame associated with the output data that corresponds to the output data anomaly), a degree of contribution comparison (e.g., a comparison of an impact that the input data that corresponds to the input data anomaly has on the output data that correspond to the output data anomaly), and/or other comparisons, including those described herein.

Figure 4D:
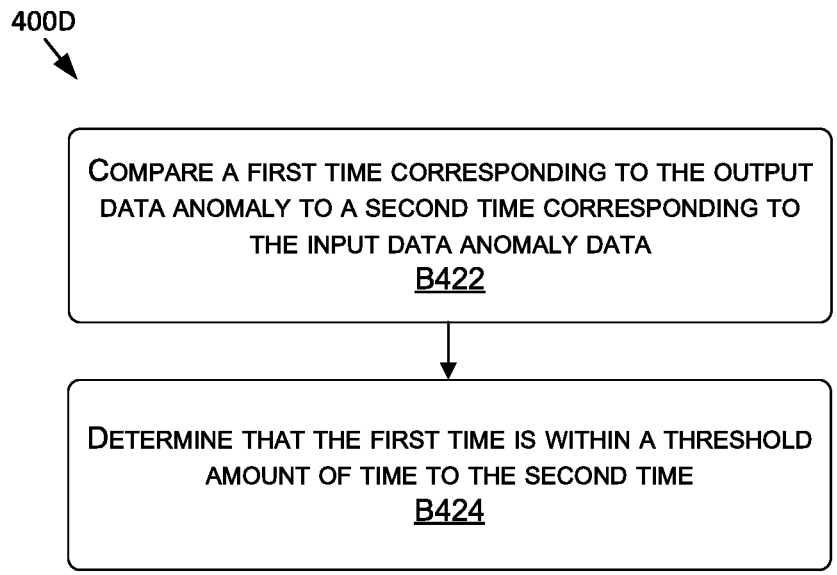
FIG. 4D is a flow diagram showing another method for anomaly detection and reporting for machine learning models in accordance with some embodiments of the present disclosure.

FIG. 4D is a flow diagram showing another method 400D for anomaly detection and reporting for machine learning models in accordance with some embodiments of the present disclosure. The method 400D at block B422 includes comparing a first time corresponding to the output data anomaly to a second time corresponding to the input data anomaly. For example, the comparison of the input data anomaly to the output data anomaly of block B408 of the method 400A may include comparing a first time corresponding to the output data anomaly to a second time corresponding to the input data anomaly.

The method 400D at block B424 includes determining that the first time is within a threshold amount of time to the second time. For example, based at least in part on the comparison of the first time to the second time, the model deployment system 118 may determine that the first time is within a threshold amount of time to the second time. In machine learning models, some of the input data may be reflected in real-time or near real-time on the output data, as described herein. In such examples, the first time being within the threshold amount of time to the second time may indicate that the input data anomaly has contributed, at least in part, to the output data anomaly.

Figure 4E:
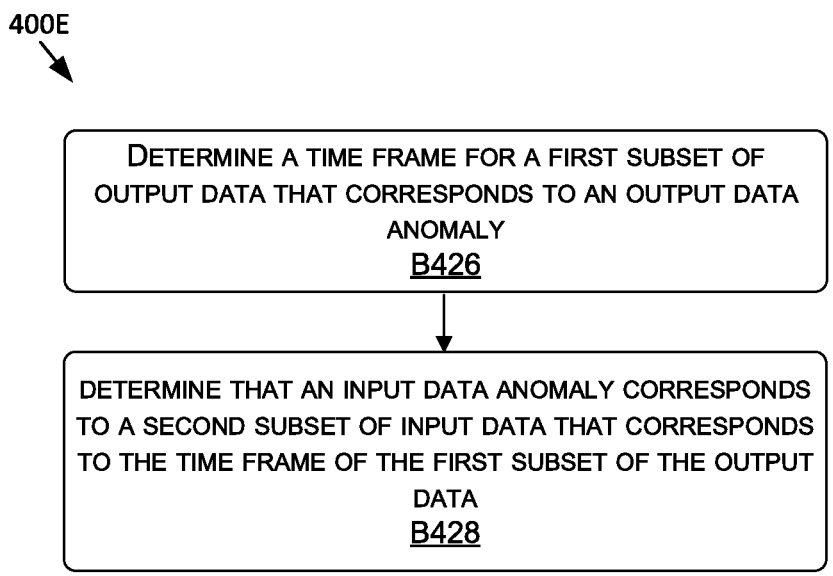
FIG. 4E is a flow diagram showing another method for anomaly detection and reporting for machine learning models in accordance with some embodiments of the present disclosure.

FIG. 4E is a flow diagram showing another method 400E for anomaly detection and reporting for machine learning models in accordance with some embodiments of the present disclosure. The method 400E at block B426 includes determining a time frame for a first subset of output data that corresponds to an output data anomaly. For example, in order to determine that the input data anomaly contributed to the output data anomaly at block B408 of the method 400A, the model deployment system 118 may determine a time frame (or a time) for a first subset of the output data 212 that corresponds to the output data anomaly.

The method 400E at block B428 includes determining that an input data anomaly corresponds to a second subset of the input data that corresponds to the time frame of the first subset of the output data. For example, in order to determine that the input data anomaly contributed to the output data anomaly at block B408 of the method 400A, the model deployment system 118 may determine that an input data anomaly corresponds to a second subset of the input data (e.g., the raw input data 120 and/or the preprocessed input data 122) that corresponds to the time frame of the first subset of the output data 212. In machine learning models, some of the input data may be reflected with a time lag, as described herein, with respect to the input data's impact on the output data. In such an example, a determination that the input data anomaly corresponds to a second subset of the input data that corresponds to the time frame of the first subset of the output data 212 may be indicate that the input data anomaly has contributed to, at least in part, the output data anomaly. For example, the time lag between the input data and the output data may be determined, and the input data anomalies corresponding to the input data associated with the time lag may then be determined.

Now returning to the method 400A, the method 400A at block B410 includes generating a report indicative of the input data anomaly and the output data anomaly. For example, the model deployment system 118 (e.g., using the report generator 128) may generate a report(s) 214 indicative of the input data anomaly, the output data anomaly (and/or a performance anomaly based at least in part on the output data), and/or a relationship there between. For example, the report(s) 214 may include information similar to the report 376 of FIG. 3D, as described herein.

The method 400A at block B412 includes transmitting a message including the report to a client device. For example, the model deployment system 118 (e.g., using the communication interface 208) may transmit the report(s) 214 (e.g., via one or more signals) to the client device 222. The signal(s) may be configured to cause display by the client device 222 of the report(s) 214 on the display 220 within a GUI, such as the GUI(s) described herein (e.g., with respect to FIGS. 3A-3D).

Figure 5:
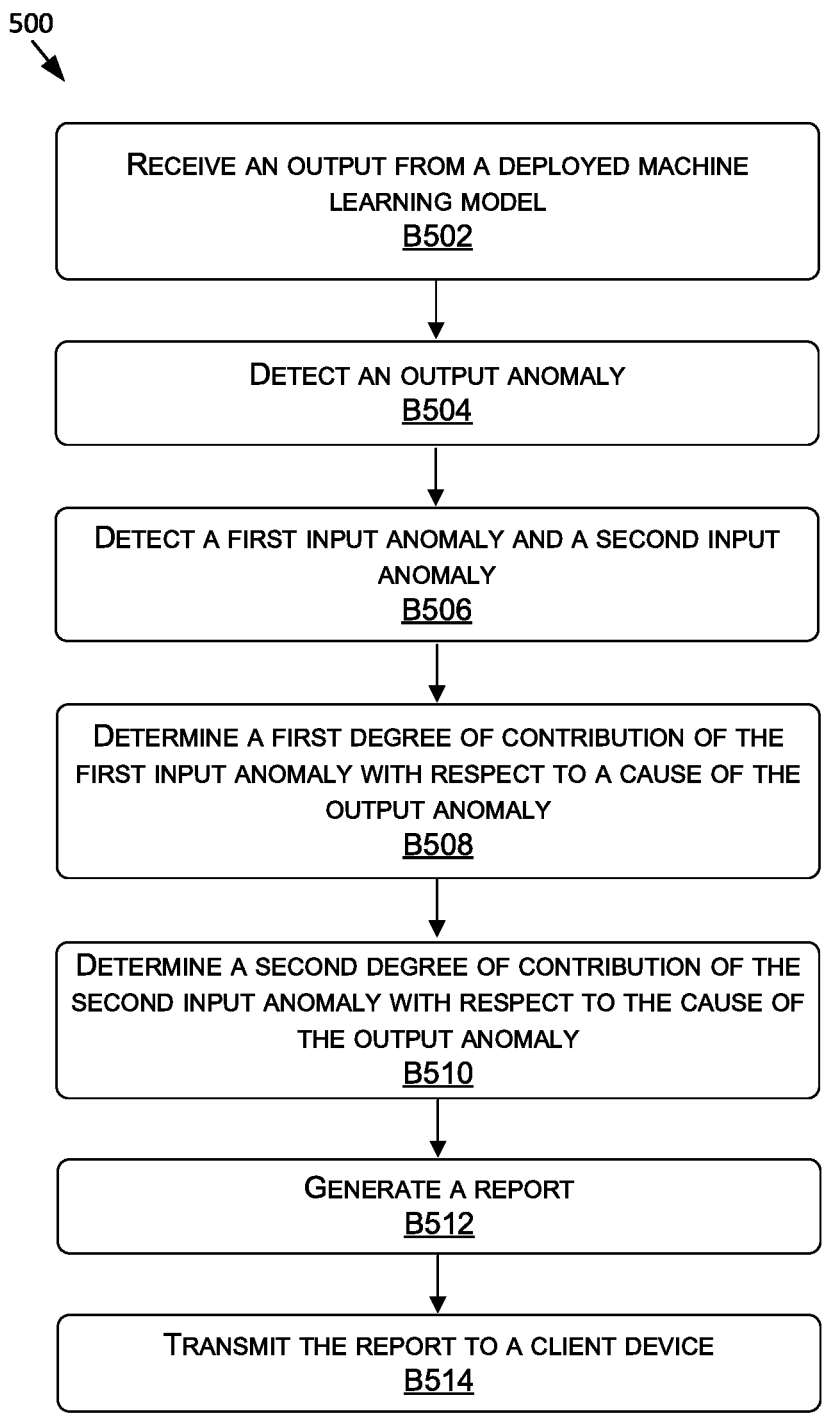
FIG. 5 is a flow diagram showing another method for anomaly detection and reporting for machine learning models in accordance with some embodiments of the present disclosure.

Now referring to FIG. 5, FIG. 5 is a flow diagram showing another method 500 for anomaly detection and reporting for machine learning models in accordance with some embodiments of the present disclosure. The method 500 at block B502 includes receiving an output from a deployed machine learning model. For example, the model deployment system 118 may receive the output data 212 generated by the deployed model 124.

The method 500 at block B504 includes detecting an output anomaly. For example, the model deployment system 118 (e.g., using the output analyzer 114) may detect an output data anomaly.

The method 500 at block B506 includes detecting a first input anomaly and a second input data anomaly. For example, the model deployment system 118 (e.g., using the input analyzer 112) may detect a first input data anomaly and a second input data anomaly.

The method 500 at block B508 includes determining a first degree of contribution of the first input data anomaly with respect to a cause of the output anomaly. For example, the contribution determiner 126 may determine the first degree (or factor) of contribution of the first input data anomaly to the cause of the output data anomaly. The determination may be made using any of a variety of methods, including, but not limited to, those described herein.

The method 500 at block B510 includes determining a second degree of contribution of the second input data anomaly with respect to a cause of the output anomaly. For example, the contribution determiner 126 may determine the second degree (or factor) of contribution of the second input data anomaly to the cause of the output data anomaly. The determination may be made using any of a variety of methods, including, but not limited to, those described herein.

The method 500 at block B512 includes generating a report. For example, the model deployment system 118 (e.g., using the report generator 128) may generate a report(s) 214.

The method 500 at block B514 includes transmitting the report to a client device. For example, the model deployment system 118 may transmit the report(s) 214 to the client device(s) 222 using the communication interface 208.

The disclosure may be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

Figure 6:
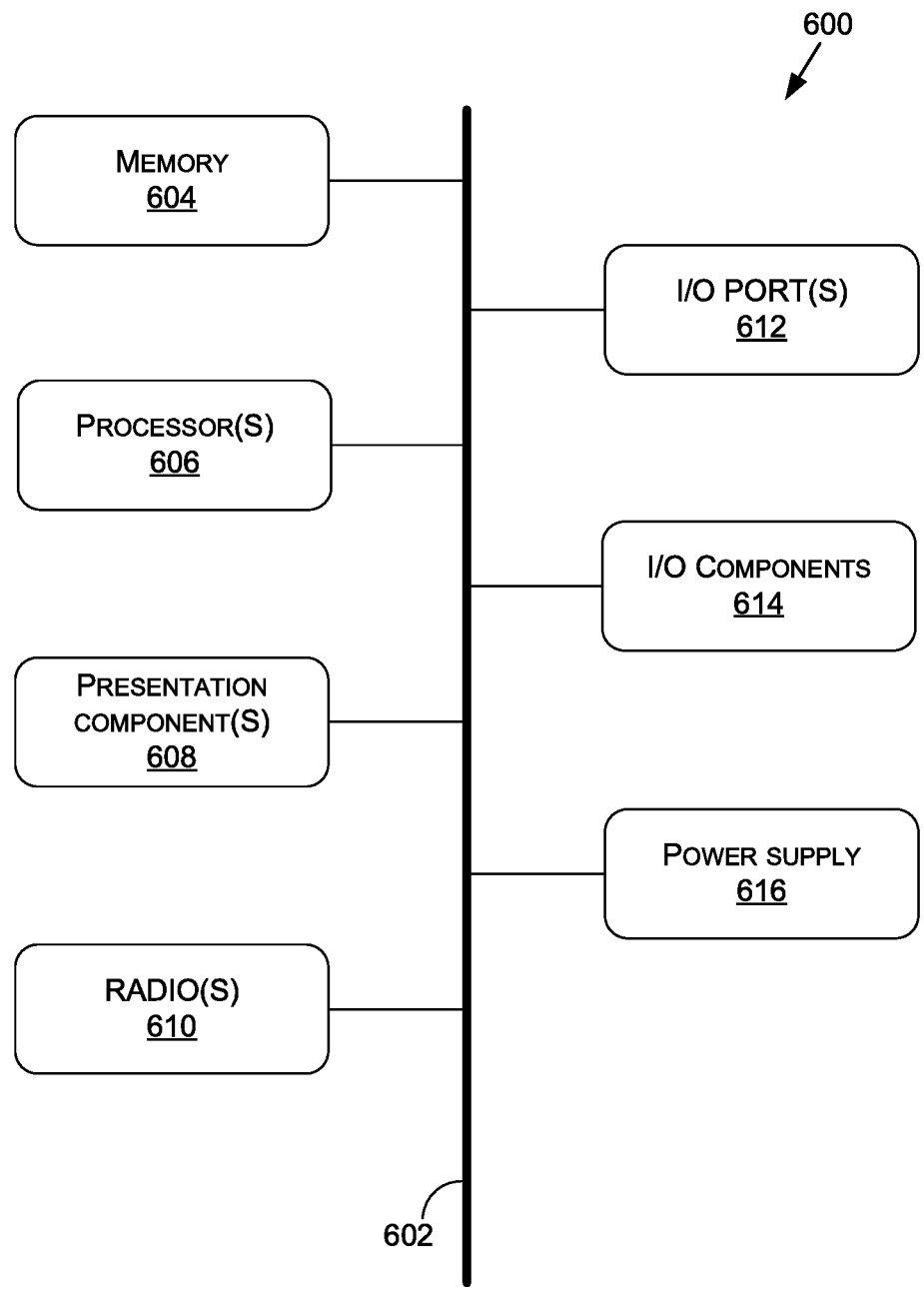
FIG. 6 is a block diagram of an example computing environment suitable for use in implementing some embodiments of the present disclosure.

With reference to FIG. 6, computing device 600 includes a bus 602 that directly or indirectly couples the following devices: memory 604, one or more processors 606, one or more presentation components 608, one or more radios 610, input/output (I/O) ports 612, input/output components 614, and an illustrative power supply 616. Bus 602 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component 608 such as a display device to be an I/O component 614. Also, processors have memory. As such, the computing device 600 is not intended to be limiting, but is provided merely as an illustrative example of a computing device that can be used in connection with one or more embodiments of the present disclosure. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 604 includes computer-storage media in the form of volatile and/or nonvolatile memory. The memory may be removable, non-removable, or a combination thereof. Example hardware devices include solid-state memory, hard drives, optical-disc drives, etc. Computing device 600 includes one or more processors that read data from various entities such as memory 604 or I/O components 6614. Presentation component(s) 608 present data indications to a user or other device. Example presentation components include a display device, speaker, printing component, vibrating component, etc.

I/O ports 614 allow computing device 600 to be logically coupled to other devices including I/O components 6614, some of which may be built in. Illustrative components include a microphone, joystick, game pad, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B.

As can be understood, embodiments of the present disclosure provide for, among other things, determining causal relationships between input data anomalies and output data anomalies and/or performance anomalies of machine learning models. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer system comprising:
   one or more processors; and
   one or more computer storage media storing computer-usable instructions that, when used by the one or more processors, cause the one or more processors to perform operations comprising:
      detecting an input data anomaly based at least in part on analyzing input data of a deployed machine learning model;
      detecting an output data anomaly based at least in part on analyzing output data generated by the deployed machine learning model;
      determining that the input data anomaly contributed to the output data anomaly based at least in part on comparing the input data anomaly to the output data anomaly;
      generating a report indicative of the input data anomaly having contributed to the output data anomaly; and
      transmitting a message including the report to a client device, the message configured to cause the client device to display the report.

2. The system of claim 1, wherein the analyzing the input data comprises:
   determining historical input data for the deployed machine learning model; and
   comparing the input data to the historical input data,
   wherein the detecting the input data anomaly is based at least in part on the comparing the input data to the historical input data.

3. The system of claim 1, wherein the detecting the input data anomaly comprises:
   based at least in part on comparing the input data to historical input data, determining that the input data includes at least one of a data quality issue or a data distribution issue with respect to the historical input data,
   wherein the input data anomaly includes the at least one of the data quality issue or the data distribution issue.

4. The system of claim 1, wherein the analyzing the output data of the deployed machine learning model comprises:
   determining historical output data for the deployed machine learning model; and
   comparing the output data to the historical output data,
   wherein the detecting the output data anomaly is based at least in part on the comparing the output data to the historical output data.

5. The system of claim 1, wherein the detecting the output data anomaly comprises:
   based at least in part on comparing the output data to historical output data, determining that the output data differs from the historical output data by more than a threshold amount.

6. The system of claim 1, wherein the comparing the input data anomaly to the output data anomaly comprises:
   determining a first time of the output data anomaly;
   determining a second time of the input data anomaly; and
   comparing the first time to the second time.

7. The system of claim 1, wherein the determining that the input data anomaly contributed to the output data anomaly comprises:
   determining, based at least in part on comparing a first time corresponding to the output data anomaly to a second time corresponding to the input data anomaly, that the first time is within a threshold amount of time to the second time.

8. The system of claim 1, wherein the determining that the input data anomaly contributed to the output data anomaly comprises:
   determining a time frame of a first subset of the output data that corresponds to the output data anomaly;
   determining that the first input data anomaly contributed to the output data anomaly based at least in part on determining that the first input data anomaly corresponds to a second subset of the input data that corresponds to the time frame of the first subset of the output data.

9. The system of claim 1, wherein the report includes a first indication of the input data anomaly, a second indication of the output data anomaly, and a third indication of the contribution of the input data anomaly to the output data anomaly.

10. The system of claim 1, wherein the input data anomaly is a first input data anomaly, and wherein the one or more computer storage media further store computer-usable instructions that, when used by the one or more processors, cause the one or more processors to perform operations comprising:
    detecting a second input data anomaly based at least in part on the analyzing the input data of the deployed machine learning model;
    determining that the second input data anomaly contributed to the output data anomaly based at least in part on comparing the second input data anomaly to the output data anomaly;
    calculating, using another machine learning model, contribution factors for each type of the input data, the contribution factors representative of degrees of contribution of each type of the input data to the output data of the deployed machine learning model;
    determining a first contribution factor for a first type of the input data associated with the with the first input data anomaly; and
    determining a second contribution factor for a second type of the input data associated with the second input data anomaly,
    wherein, based at least in part on the first contribution factor and the second contribution factor, the message is further indicative of the degrees of contribution of the first input data anomaly and the second input data anomaly to the output data anomaly.

11. The system of claim 1, wherein the input data anomaly is a first input data anomaly, and wherein the one or more computer storage media further store computer-usable instructions that, when used by the one or more processors, cause the one or more processors to perform operations comprising:
    determining a first weight indicative of a first contribution of the first input data anomaly to the output data anomaly;
    determining a second weight indicative of a second contribution of a second input data anomaly to the output data anomaly; and determining that the first weight is greater than the second weight, wherein the message is further indicative of the second input data anomaly, and wherein the first input data anomaly is displayed before the second input data anomaly based at least in part on the first weight being greater than the second weight.

12. A computer-implemented method performed by at least one processor, the method comprising:

detecting an output anomaly based at least in part on analyzing an output of a deployed machine learning model;

detecting a first input anomaly and a second input anomaly based at least in part on analyzing an input to the deployed machine learning model;

determining a first degree of contribution of the first input anomaly to a cause of the output anomaly;

determining a second degree of contribution of the second input anomaly to the cause of the output anomaly;

generating a report indicative of the first degree of contribution and the second degree of contribution; and transmitting the report to a client device for display by the client device.

13. The method of claim 12, wherein the detecting the output anomaly comprises:

determining historical performance metrics for outputs of the deployed machine learning model;

calculating performance metrics for the output of the deployed machine learning model; and determining that the performance metrics are indicative of the output anomaly based at least in part on comparing the performance metrics to the historical performance metrics.

14. The method of claim 12, wherein the detecting the output anomaly comprises determining that a difference between values of one or more performance metrics and historical values of the one or more performance metrics is greater than a threshold amount based at least in part on comparing the values to the historical values.

15. The method of claim 12, wherein the analyzing the output of the machine learning model comprises:

obtaining output data of the deployed machine learning model for a given time period;

determining ground truth data for the given time period;

comparing the output data for the given time period to the ground truth data for the given time period; and generating values for one or more performance metrics based at least in part on the comparing the output data for the given time period and the ground truth data for the given time period.

16. The method of claim 12, wherein the report includes an indication of a type of anomaly for each of the first input anomaly and the second input anomaly, the type of anomaly corresponding to at least one of an input data quality issue or an input data distribution issue.

17. The system of claim 12, wherein the determining the first degree of contribution of the first input anomaly comprises:

determining a time frame of a first subset of the output that corresponds to the output anomaly; and determining that the first input anomaly is causally related to the output anomaly based at least in part on determining that the first input anomaly corresponds to a second subset of the input that corresponds to the time frame of the first subset of the output.

18. The method of claim 12, wherein the analyzing the input comprises:

determining historical input data for the machine learning model; and comparing input data of the input to the historical input data.

19. A computer system comprising:

an input analyzer means for detecting an input data anomaly based at least in part on analyzing input data of a deployed machine learning model;

an output analyzer means for detecting an output data anomaly based at least in part on analyzing output data of the deployed machine learning model;

a contribution determiner means for determining a contribution of the input data anomaly to the output data anomaly; and a report generator means for generating a report indicative of the contribution of the input data anomaly to the output anomaly.

20. The computer system of claim 19, wherein the report includes an indication of a type of anomaly of the input anomaly, the type of anomaly corresponding to at least one of an input data quality issue or an input data distribution issue.

* * * * *

UNITED STATES PATENT AND TRADEMARK OFFICE
CERTIFICATE OF CORRECTION

| | |
|---|---|
| PATENT NO. | : 11,449,712 B2 |
| APPLICATION NO. | : 16/220333 |
| DATED | : September 20, 2022 |
| INVENTOR(S) | : Deepak Pai et al. |

It is certified that error appears in the above-identified patent and that said Letters Patent is hereby corrected as shown below:

In the Claims

Claim 10, Column 34, Line 46:
In the line reading "input data associated with the with the first input data" should read -- input data associated with the first input data --.

Claim 17, Column 36, Line 10:
In the line reading "The system of claim 12, wherein the determining the" should read -- The method of claim 12, wherein the determining the --.

Signed and Sealed this
Fifteenth Day of November, 2022

Katherine Kelly Vidal
*Director of the United States Patent and Trademark Office*